United States Patent
Kobayashi et al.

(10) Patent No.: US 7,315,670 B2
(45) Date of Patent: Jan. 1, 2008

(54) OPTICAL SWITCH

(75) Inventors: Shohei Kobayashi, Hino (JP); Junichi Nakano, Hachioji (JP); Kenzi Murakami, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/329,890

(22) Filed: Jan. 11, 2006

(65) Prior Publication Data
US 2006/0159389 A1 Jul. 20, 2006

(30) Foreign Application Priority Data
Jan. 19, 2005 (JP) ............... 2005-011357

(51) Int. Cl.
*G02B 6/26* (2006.01)
(52) U.S. Cl. ............... 385/17; 385/15; 385/16; 385/20
(58) Field of Classification Search .......... 385/16, 385/17, 20
See application file for complete search history.

(56) References Cited
U.S. PATENT DOCUMENTS
6,690,885 B1  2/2004  Aksyuk et al.

2005/0025411 A1 * 2/2005 Nakano et al. ............... 385/16

FOREIGN PATENT DOCUMENTS
JP   2001-174724   6/2001

* cited by examiner

Primary Examiner—Jennifer Doan
(74) Attorney, Agent, or Firm—Scully, Scott, Murphy & Presser, P.C.

(57) ABSTRACT

An optical switch includes a plurality of light inputting members, a plurality of light outputting members, an optical coupling member which couples light to the light inputting members and the light outputting members, an optical path changing member which changes an optical path from the light inputting members up to the light outputting members, an optical path shielding member which can take a first position which shields collectively all optical paths from the light inputting members up to the light outputting members and a second position which allows light to pass through the optical path, a first driving circuit which drives the optical path changing member, and a second driving circuit which drives the optical path shielding member.

60 Claims, 27 Drawing Sheets

OPTICAL SWITCH

CROSS-REFERENCE TO RELATED APPLICATION

The present application is based upon and claims the benefit of priority from the prior Japanese Patent Application No. 2005-011357 filed on Jan. 19, 2005; the entire contents of which are incorporated herein by reference.

BACKGROUND OF THE INVENTION

1. Field of the Invention

The present invention relates to an optical switch, and in particular to an optical switch that uses a deflection of light by a movable mirror array.

2. Description of the Related Art

A structure in which light from an optical fiber array for input is switched to an optical fiber array for output is hitherto known. For example, in a structure disclosed in Japanese Patent Application Laid-open Publication No. 2001-174724, first of all, light that is emitted from the optical fiber array for input passes through a lens array for input. Light passed through the lens array is reflected at a first MEMS (micro electro mechanical system) mirror array and a second MEMS mirror array. The reflected light passes through a lens array for output and is incident on the optical fiber array for output. Here, an angle of inclination of each mirror in the first MEMS mirror array and the second MEMS mirror array is controlled by an electric signal. Accordingly, light from the optical fiber array for input is deflected according to the angle of inclination of each mirror by the electric signal. The deflected light is output to a desired port for output (optical fiber for output).

In the structure mentioned above, when a supply of voltage to the MEMS mirror array is stopped, a control of the angle of inclination of the mirror by the electric control signal stops functioning. Due to this, it is not certain as to which output port the reflected light is to be output to. Therefore, light from the optical fiber for input is output to an output port (optical fiber for output) to which the light is not intended to be output. As a result, there is a possibility of inducing a malfunctioning of an optical switch, and consequently an optical communication system in which this optical switch is used.

SUMMARY OF THE INVENTION

The present invention is made in view of the problems mentioned above and it is an object of the present invention to provide an optical switch which is capable of preventing a malfunctioning by shielding all optical paths when a supply of voltage from a power supply which drives the movable mirror array is stopped, or when a voltage value of a power supply which drives a movable mirror array becomes less than or equal to a predetermined value, or when a control signal is input from an outside.

To solve the issues mentioned above and to achieve the object, according to the present invention, there can be provided an optical switch which includes a plurality of light inputting members, a plurality of light outputting members, an optical coupling member which couples light to the light inputting members and the light outputting members, an optical path changing member which changes an optical path from the light inputting members up to the light outputting members, an optical path shielding member which can take a first position which shields collectively all the optical paths from the light inputting members up to the light outputting members, and a second position which allows light to pass through the optical path, a first driving circuit which drives the optical path changing member, and a second driving circuit which drives the optical path shielding member.

Moreover, according to a favorable aspect of the present invention, the optical switch further includes a power supply which supplies a voltage to the first driving circuit and the second driving circuit, and it is desirable that the light shielding member shields collectively all the optical paths connecting to the light outputting member by taking the first position, when there is no supply voltage from the power supply.

Moreover, according to another favorable aspect of the present invention, the optical switch further includes the power supply which supplies voltage to the first driving circuit and the second driving circuit, and a power supply monitoring member which monitors the voltage supplied by the power supply, and it is desirable that when the power supply monitoring member detects a voltage drop in a voltage supplied by the power supply, the second driving circuit drives the optical path shielding member to the first position such that all the optical paths connecting to the light outputting member are shielded collectively.

Moreover, according to still another favorable aspect of the present invention, it is desirable that the second driving circuit drives the optical path shielding member based on a control signal sent from an outside of the optical switch.

Moreover, according to still another favorable aspect of the present invention, it is desirable that the optical path changing member includes a movable mirror array which can be electrically controlled by the first driving circuit, and the light is output to the light outputting member by electrically controlling an angle of each mirror in the movable mirror array.

Moreover, according to still another favorable aspect of the present invention, it is desirable that the optical path shielding member is disposed between the optical coupling member and the movable mirror array.

Moreover, according to still another favorable aspect of the present invention, it is desirable that the optical path shielding member is disposed either between the light inputting member and the optical coupling member or between the light outputting member and the optical coupling member.

Moreover, according to still another favorable aspect of the present invention, the optical coupling member is a collimating lens.

Moreover, according to still another favorable aspect of the present invention, the optical switch further includes a first lens and a spectroscope which separate light according to a wavelength, and it is desirable that a plurality of light beams having different wavelength are input from the light inputting member, the input light beams pass through the optical coupling member, the spectroscope, and the first lens, and are irradiated on each mirror in the movable mirror array according to the wavelength, and by performing the electric control of an angle of each mirror of the movable mirror array, the light is output to the light outputting member.

Moreover, according to still another aspect of the present invention, it is desirable that the optical path shielding member is disposed between the optical coupling member and the spectroscope.

Moreover, according to still another aspect of the present invention, it is desirable that the optical path shielding member is disposed between the spectroscope and the movable mirror array.

Moreover, according to still another favorable aspect of the present invention, it is desirable that a relay optical system is provided between the optical coupling member and the spectroscope, and that all the optical paths connecting to the light outputting member are allowed to intersect at a point and the light shielding member is disposed at a position where the optical paths intersect at the point.

Moreover, according to the present invention, the optical switch can be let to have a structure which includes one optical fiber for input and a plurality of optical fibers for output or a structure which includes a plurality of optical fibers for input and one optical fiber for output.

According the present invention, it is possible to provide an optical switch which is capable of preventing the malfunctioning by shielding all optical paths when the supply of voltage of the power supply which drives the movable mirror array is stopped, or when the voltage value of the power supply which drives the movable mirror array becomes not greater than the predetermined value, or when the control signal is input from the outside.

DETAILED DESCRIPTION OF THE INVENTION

Exemplary embodiments of the present invention will be described below in detail with reference to the accompanying diagrams. However, the present invention is not restricted to the embodiment described below.

First Embodiment

Figure 1:
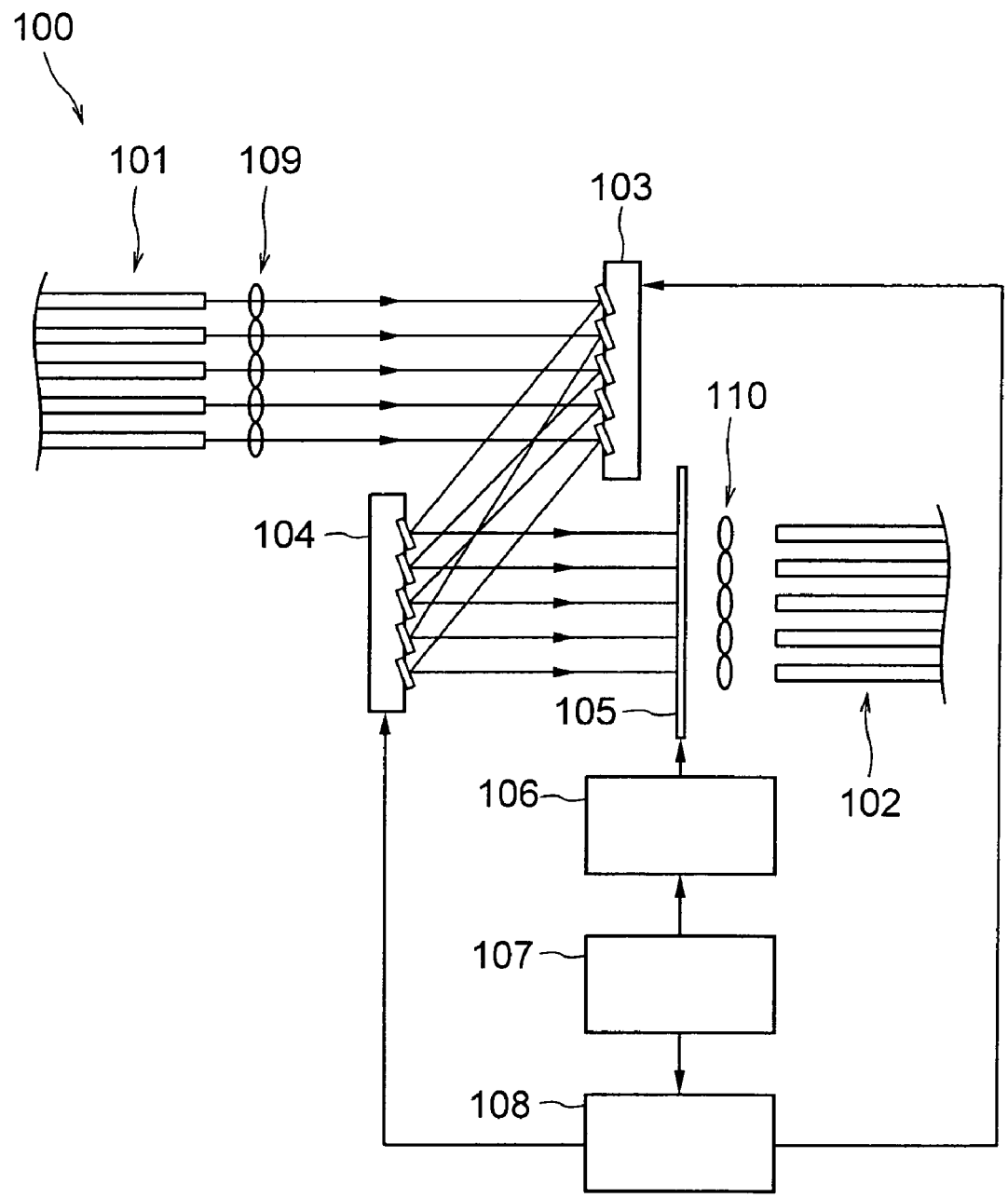
FIG. 1 is a diagram denoting a schematic structure of an optical switch according to a first embodiment of the present invention.

FIG. 1 is a diagram denoting a schematic structure of an optical switch 100 according to a first embodiment of the present invention. An optical fiber for input 101 includes a plurality of optical fibers for input. The optical fiber for input 101 corresponds to a light inputting member. A collimating lens 109 is disposed near an emitting end surface of the optical fiber for input 101. The collimating lens 109 includes a plurality of collimating lenses and each lens corresponds with one of the plurality of optical fibers respectively. Light emitted from the optical fiber for input 101 is incident on a corresponding collimating lens 109. The collimating lens 109 converts the light which is incident to a substantially parallel light and the substantially parallel light is emerged from the collimating lens 109. The collimating lens 109 corresponds to an optical coupling member. Light emerged from the collimating lens 109 is incident on a first movable mirror array 103.

The first movable mirror array 103 includes a plurality of mirrors. In this case, the mirrors are provided corresponding to the plurality of optical fibers for input 101 respectively. Light reflected at the first movable mirror array 103 is incident on a second movable mirror array 104. The second movable mirror array 104 includes a plurality of mirrors. Accordingly, the light reflected at each mirror of the first movable mirror array 103 is incident selectively on a specific mirror of the second movable mirror array 104 according to an angle of inclination of each mirror. The light reflected at each mirror of the first movable mirror array 103 is further reflected at each mirror of the second movable mirror array 104 in a direction toward an optical fiber for output 102. The first movable mirror array 103 and the second movable mirror array 104 correspond to the optical path changing member.

Light reflected at the second movable mirror array 104 reaches a shutter 105. The shutter 105 can take selectively a first position and a second position. The shutter 105 at the first position shields collectively all optical paths from the optical fibers for input 101 up to the optical fibers for output 102 which will be described later. Whereas, the shutter 105 at the second position allows light to pass through the optical paths from the optical fibers for input 101 up to the optical fibers for output 102. FIG. 1 denotes the shutter 105 at the first position, in other words, the shielding of the optical paths. A detailed structure of the shutter 105 will be described later. The shutter 105 corresponds to an optical path shielding member.

When the shutter 105 is at the second position, in other words, when the shutter allows the light to pass through the optical path, the light reflected at the second movable mirror array 104 is incident on a collimating lens 110. The collimating lens 110 includes a plurality of collimating lenses and each lens corresponds with one of the plurality of optical fibers for output 102 respectively. The collimating lens 110 is disposed near an end surface of the optical fiber for output 102. The collimating lens 110 converges substantially parallel light which is incident, on an emitting end surface of the optical fiber for output 102. The collimating lens 110 corresponds to an optical coupling member.

An angle of each mirror of the first movable mirror array 103 and an angle of each mirror of the second movable mirror array 104 are electrically controlled by a mirror driving circuit 108. The mirror driving circuit 108 corresponds to a first driving circuit. An optical path of light input from the optical fiber for input 101 can be changed as appropriate by controlling and changing the angle of each mirror of the first movable mirror array 103 and each mirror of the second mirror array 104. By changing the optical path of the light, it is possible to switch (optical switching) the optical fibers for output 102 at a destination of light input from the optical fibers for input 101.

The first movable mirror array 103 and the second movable mirror array 104 can be manufactured by using an MEMS (Micro Electro Mechanical Systems) manufacturing technology.

The shutter 105 is driven by a shutter driving circuit 106. The shutter driving circuit 106 corresponds to a second driving circuit. Moreover, a power supply 107 supplies a voltage to the mirror driving circuit 108 and the shutter driving circuit 106.

Figure 2:
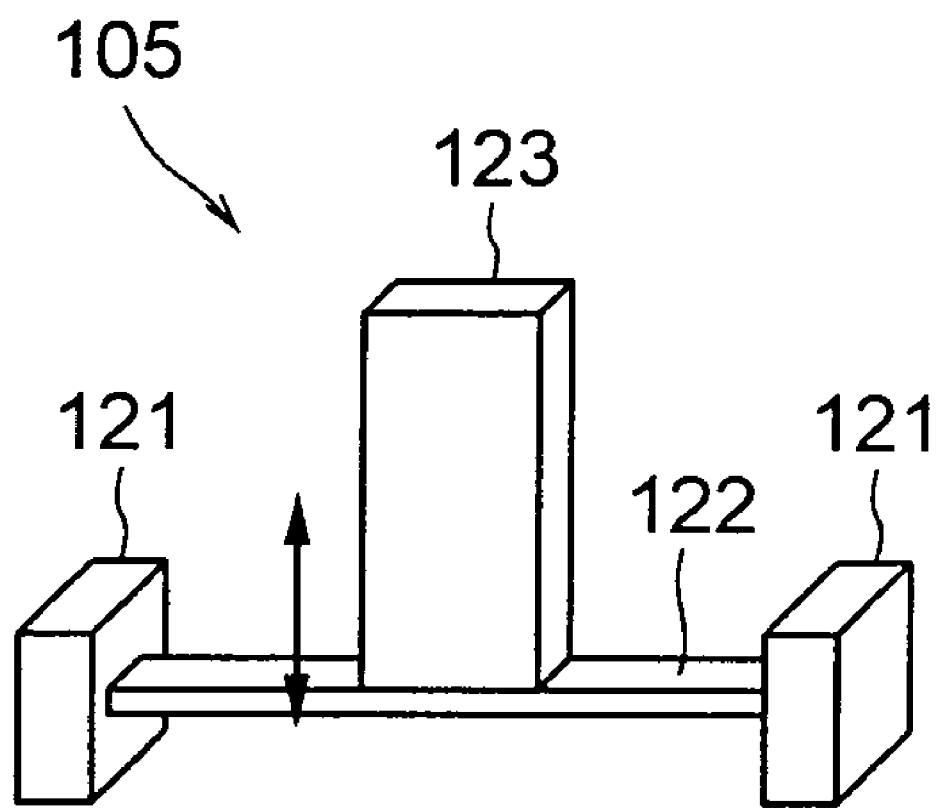
FIG. 2 is a diagram denoting a structure of a shutter of the first embodiment.

Next, the shutter 105 will be described. FIG. 2 denotes a perspective structure of the shutter 105. A beam portion 122 which is elastically deformable is supported at both ends by a pair of fixed portions 121. A light shielding portion 123 in the form of a flat plate is supported at substantially central portion of the beam portion 122. A drive electrode (not shown in the diagram) is provided near a center of the beam portion 122. The light shielding portion 123 can be driven in an upward and a downward direction in FIG. 2 by an electrostatic force by the drive electrode. The shutter 105 can be manufactured by the MEMS manufacturing technology.

To start with, a proper supply of a voltage to the shutter driving circuit 106 and the mirror driving circuit 108 from the power supply 107 will be described. When the proper voltage is supplied, an electrostatic force (attracting force) is generated in the drive electrode of the shutter 105. When the electrostatic force acts, the beam portion 122 is deformed and bent in a direction of the drive electrode. The bent status of the beam portion 122 corresponds to the second position of the shutter 105. In the second position, the light shielding portion 123 is retracted outside the optical path from inside of the optical path. Accordingly, the light can be allowed to pass through all optical paths from the optical fibers 101 for input up to the optical fibers 102 for output.

Correspondingly, a situation when the voltage is not supplied from the power supply 107 to the mirror driving circuit 108 and the shutter driving circuit 106 will be described below. This situation corresponds to a situation of a sudden stop due to an electric power failure etc. of a power supply of an optical communication system in a telephone exchange where the optical switch 100 is provided. With no voltage supplied from the power supply 107, the angle of each mirror in the first movable mirror array 103 and the angle of each mirror in the second movable mirror array 104 are not at all controlled electrically. Therefore, it is not possible to control as to toward which optical fibers for output 102, the light reflected at the first movable mirror array 103 and the second movable mirror array 104, is to be directed.

In the first embodiment, when the voltage is not supplied from the power supply 107 to the mirror driving circuit 108 and the shutter driving circuit 106, the drive electrode (not shown in the diagram) of the shutter 105 does not generate the electrostatic force (attracting force). When the electrostatic force does not act, the beam portion 122 is not bent and is in a substantially straight line form, i.e. a form shown in FIG. 2. The straight line form of the beam portion 122 corresponds to the first position of the shutter 105. In the first position, the light shielding portion 123 is inserted into the optical path. Further, the light shielding portion 123 shields collectively, all optical paths from the optical fibers for input 101 up to the optical fibers for output 102. Therefore, light is not output to the optical fibers for output 102. As a result, an effect of preventing a malfunctioning of the optical switch 100, and consequently a malfunctioning of an optical communication system in which the optical switch 100 is used, is achieved.

First Modified Embodiment of Shutter

Figure 3A:
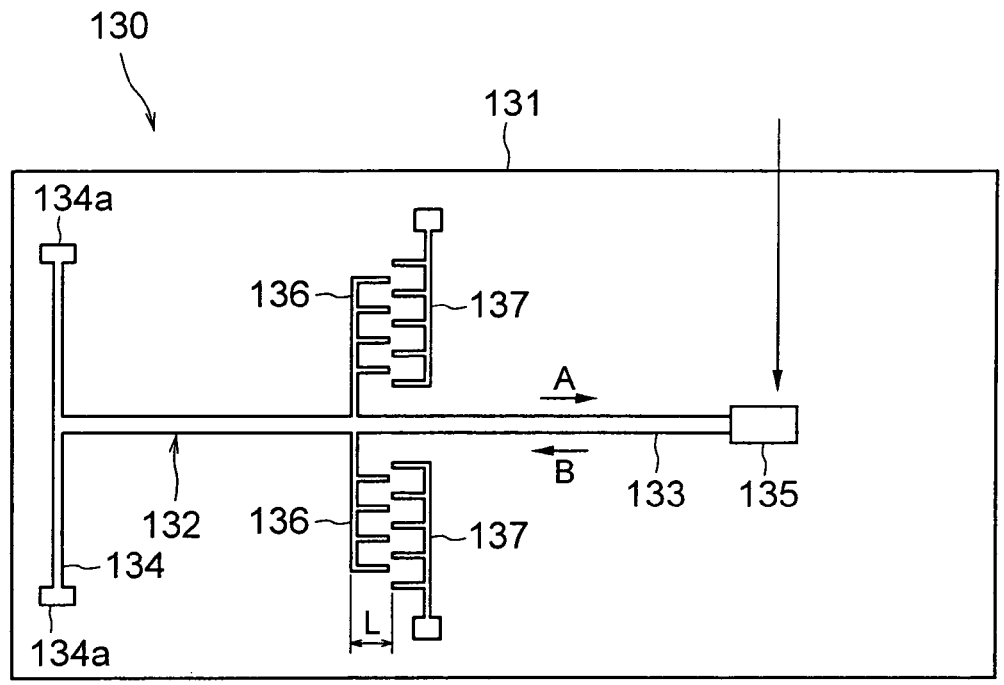
FIG. 3A is a diagram denoting a structure of a first modified embodiment of the shutter of the first embodiment.
Figure 3B:
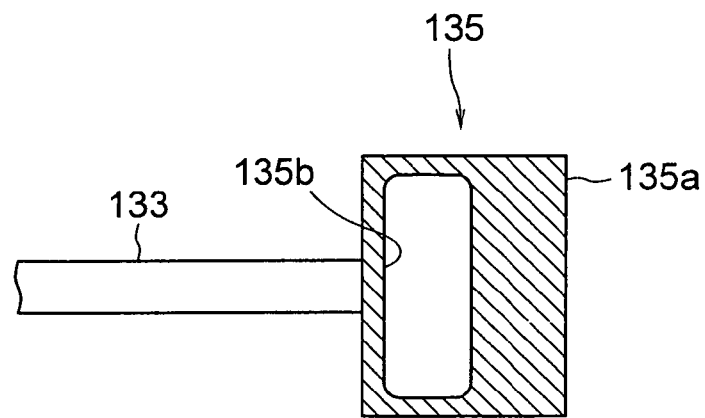
FIG. 3B is a diagram denoting a structure of a light shielding plate in the first modified embodiment of the shutter.

FIG. 3A and FIG. 3B denote a structure of a shutter 130 suitable for the optical switch 100 of a first modified embodiment and FIG. 3A denotes a schematic structure of the shutter 130.

A base plate 131 of the shutter 130 is a rectangular shaped plate of a size of few millimeters and is formed of a material such as glass. The base plate 131 has a flat surface, and a movable member 132 moves forward and backward on the surface of the base plate 131 in a direction of an arrow A and an arrow B.

The movable member 132 is a switching operation portion provided on the base plate 131. The movable member 132 includes a movable portion 133 having a shape of a long slender rod extending in the direction of arrows A and B along the surface of the base plate 131, a supporting beam 134 which is elastically deformable and which is formed integrally on one end side of the movable portion 133, a light shielding plate 135 which is formed on an other end side of the movable portion 133 and which moves forward and backward with respect to the optical path described later, and movable electrodes 136 which are described later.

The movable portion 133, the supporting beam 134, the light shielding plate 135, and the movable electrodes 136 of the movable member 132 are formed together with fixed electrodes 137 which will be described later, by performing a process such as an etching process (micro machining technology) by using a monocrystalline silicon material or a polycrystalline silicon material to form an electrostatic actuator which generates an electrostatic force between the movable electrodes 136 and the fixed electrodes 137.

In this case, the supporting beam 134 becomes a fixed portion 134a having both end sides in a longitudinal direction fixed on the base plate 131, and one end side of the movable portion 133 is formed integrally at a middle portion in the longitudinal direction of the supporting beam 134. Further, the supporting beam 134 supports the movable portion 133 with respect to the base plate 131 holding on one side, and the movable portion 133 is allowed to be displaced in the direction of arrows A and B.

Moreover, the movable electrodes 136 are formed integrally on both sides which are along a longitudinal direction of the movable portion 132. The fixed electrodes 137 are disposed facing each of the movable electrodes 136. The movable electrodes 136 and the fixed electrodes 137 are comb-teeth electrodes, and when a voltage is applied, an electrostatic force of attraction is generated between the movable electrodes 136 and the fixed electrodes 137. The movable member 132 is driven in the direction of the arrow A while causing the supporting beam 134 to be bent and be deformed elastically by the electrostatic force of attraction between the movable electrodes 136 and the fixed electrodes 137. Whereas, the movable member 132 is displaced in the direction of the arrow B due to an elastic restoring force of the supporting beam 134 when the voltage applied (electricity passed) is released.

FIG. 3B is a diagram denoting a structure of the light shielding plate 135 when viewed from a direction of advance of light. The light shielding plate 135 includes a light shielding portion 135a and an aperture 135b. The description will be continued upon returning to FIG. 3A.

To start with, a situation when a suitable voltage is supplied from the power supply 107 to the mirror driving circuit 108 and the shutter driving circuit 106 will be described. The suitable voltage, for example 10 volts is applied between the movable electrodes 136 and the fixed electrodes 137. Due to the voltage applied, the electrostatic force of attraction is generated between the movable electrodes 136 and the fixed electrodes 137. Due to the electrostatic force of attraction, the movable electrodes 136 move toward the fixed electrodes 137. The movable member 132 is driven in the direction of the arrow A while causing the supporting beam 134 to be bent and deformed elastically. The movable member 132 is displaced in the direction of the arrow A and the aperture 135b of the light shielding plate 135 is stopped at a position where the aperture 135b is advanced up to the optical path. This position corresponds to a second position of the shutter 130. At the second position of the shutter 130, the light shielding portion 135a is retracted from the inside of the optical path to the outside of the optical path. The aperture 135b allows the light to pass through all the optical paths from the optical fibers 101 for input up to the optical fibers 102 for output.

Correspondingly, a situation when the voltage is not supplied from the power supply 107 to the mirror driving circuit 108 and the shutter driving circuit 106 will be described below. This situation corresponds to a situation of a sudden stop due to an electric power failure etc. of the power supply of the optical communication system in the telephone exchange where the optical switch 130 is provided. With no voltage supplied from the power supply 107, the angle of each mirror in the first movable mirror array 103 and the angle of each mirror in the second movable mirror array 104 is not at all controlled electrically. Therefore, it is not possible to control as to toward which optical fibers for output 102, the light reflected at the first movable mirror array 103 and the second movable mirror array 104, is to be directed.

When the voltage is not supplied from the power supply 107 to the mirror driving circuit 108 and the shutter driving circuit 106, the voltage applied between the movable electrodes 136 and the fixed electrodes 137 is released. By releasing the voltage, the electrostatic force of attraction is eliminated and the movable member 132 is displaced in the direction of the arrow B due to the elastic restoring force of the supporting beam 134. Therefore, the movable member 132 returns to a position shown in FIG. 3A. At this time, the light shielding portion 135a of the light shielding plate 135 stops at a position where the light shielding portion 135a is advanced up to the optical path. This position corresponds to the first position of the shutter 130. In the first position, the light shielding portion 135a is inserted into the optical path. Further, the light shielding portion 135a shields collectively all the optical paths from the optical fibers for input 101 up to the optical fibers for output 102. Due to the collective shielding, the light is not output to the optical fibers 102 for output. As a result, the effect of preventing the malfunctioning of the optical switch 100, and consequently the malfunctioning of the optical communication system in which the optical switch 100 is used, is achieved.

Second Modified Embodiment of Shutter

Figure 4:
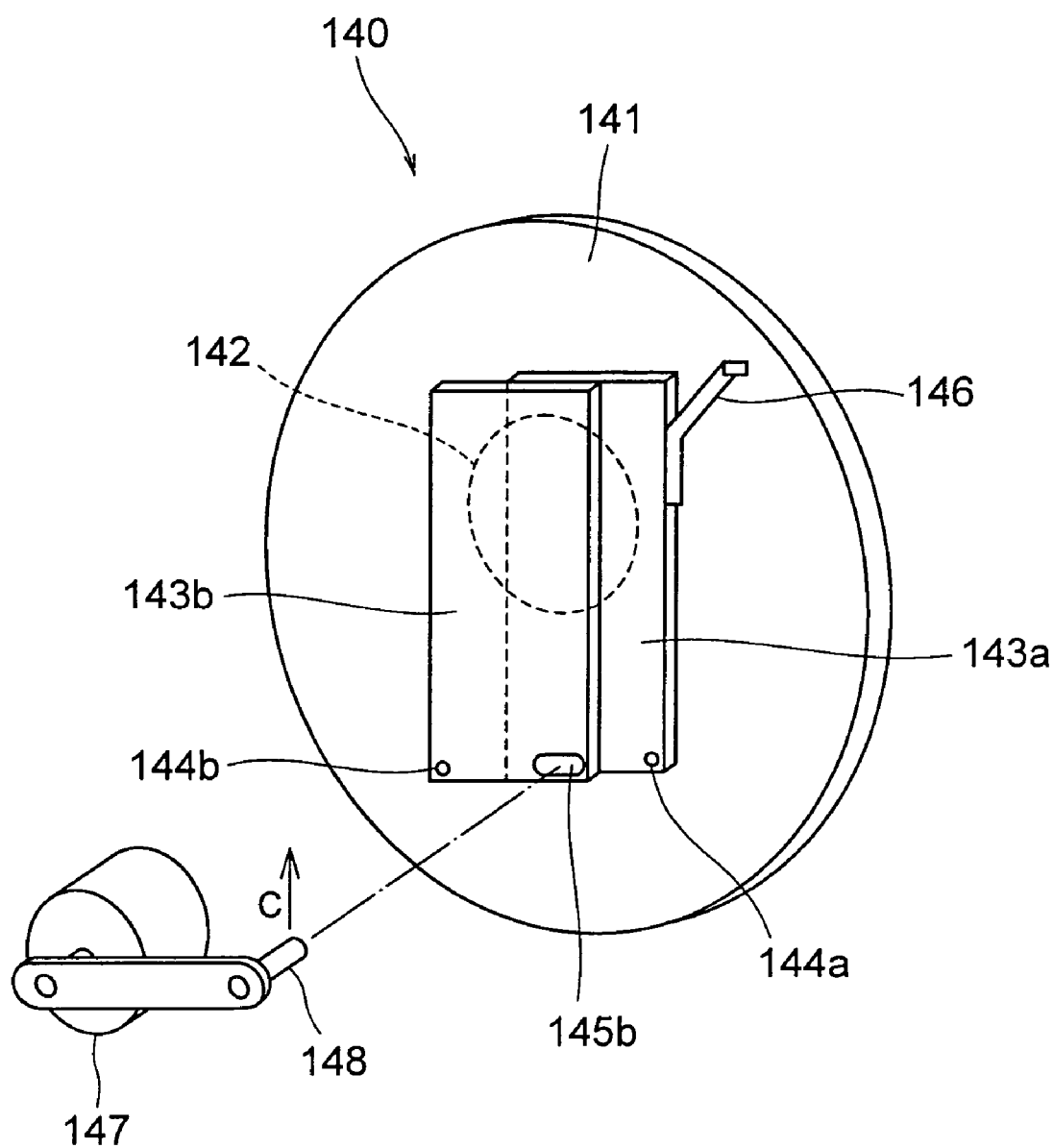
FIG. 4 is a diagram denoting a structure of a second modified embodiment of the shutter of the first embodiment.

FIG. 4 is a perspective view of a structure of another shutter 140 which is suitable for the optical switch 100 of the first embodiment. Shutter blades 143a and 143b are rotatably supported around pins 144a and 144b which are erected on a shutter base plate 141. A lever pin 148 of a shutter actuator 147 is fitted in long holes 145a and 145b which are cut in the shutter blades 143a and 143b respectively. Due to revolution of the lever pin 148 in a direction of an arrow C, an operation of opening the shutter blades 143a and 143 is performed. A plate spring 146 is provided to the shutter blade 143a. The plate spring 146 imparts force on the shutter blades 143a and 143b in a direction of closing.

Figure 5A:
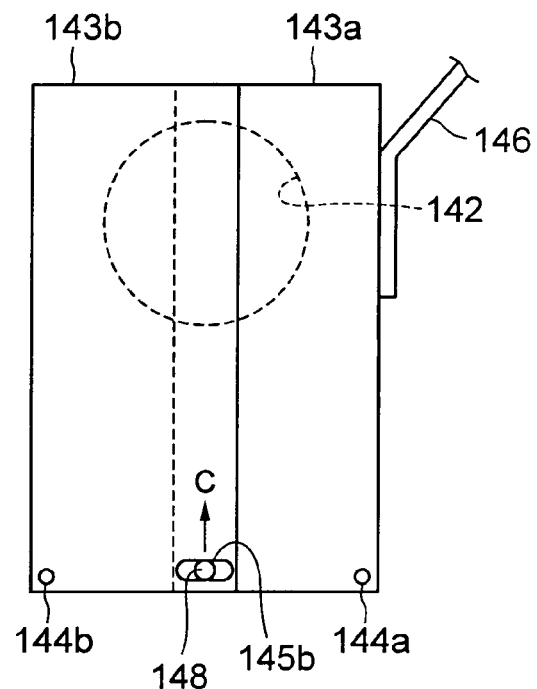
FIG. 5A is a diagram of a view seen from an optical axis direction of the second modified embodiment of the shutter.
Figure 5B:
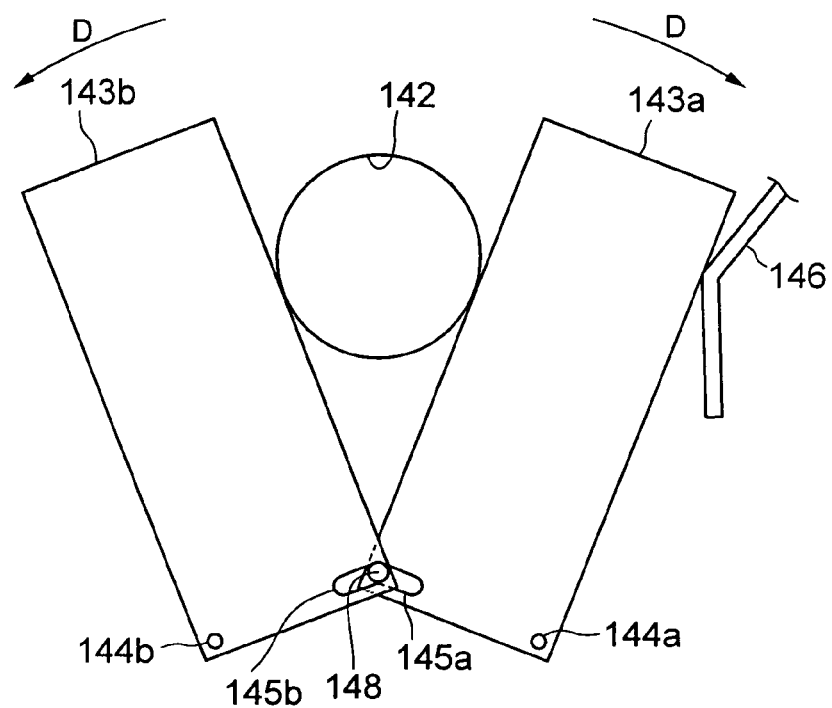
FIG. 5B is a diagram of another view seen from the optical axis direction of the second modified embodiment of the shutter.

To start with, a situation when a suitable voltage is supplied from the power supply 107 to the mirror driving circuit 108 and the shutter driving circuit 106 will be described. When the suitable voltage is applied, the lever pin 148 moves in the direction of the arrow C. Due to the movement of the lever pin 148, the shutter blades 143a and 143b are opened opposing the force imparted by the plate spring 146. Further, as shown in FIG. 5B, the shutter blades 143a and 143b are stopped at a condition opened in a direction of an arrow D. The opened condition of the shutter blades 143a and 143b corresponds to a second position of the shutter 140. In the second position, the shutter blades 143a and 143b are retracted from the optical path to the outside of the optical path. An aperture 142 allows the light to pass through all the optical beams from the optical fibers for input 101 up to the optical fibers for output 102.

Correspondingly, a situation when the voltage is not supplied from the power supply 107 to the mirror driving circuit 108 and the shutter driving circuit 106 will be described below. With no voltage supplied from the power supply 107, the angle of each mirror in the first movable mirror array 103 and the angle of each mirror in the second movable mirror array 104 is not at all controlled electrically. Therefore, it is not possible to control as to toward which optical fibers for output 102, the light reflected at the first movable mirror array 103 and the second movable mirror array 104, is to be directed.

When the voltage is not supplied from the power supply 107 to the mirror driving circuit 108 and the shutter driving circuit 106, the shutter actuator 147 moves in a direction opposite to the direction of the arrow C so as to return the lever pin 148 to an initial position. Accordingly, due to the force imparted by the plate spring 146, the shutter blades 143a and 143b are closed. Further, as shown in FIG. 5A, the shutter blades 143a and 143b stop in a closed condition. The closed condition corresponds to a first position of the shutter 140. In the first position, the shutter blades 143a and 143b are inserted into the optical path. The shutter blades 143a and 143b shield collectively all the optical paths from the optical fibers for input 101 reaching up to the optical fibers for output 102. Due to the collective shielding, the light is not output to the optical fibers for output 102. As a result, the effect of preventing the malfunctioning of the optical switch 100, and consequently the malfunctioning of the optical communication system in which the optical switch 100 is used, is achieved.

The shutters 105, 130, and 140 described above may be disposed at any position in an optical path between the optical fibers for input 101 and the collimating lens 109, or between the collimating lens 109 and the movable mirror array 103, or between the collimating lens 110 and the optical fibers for output 102. Thus, it is possible to dispose at a suitable position according to a structure of the shutter.

Modified Embodiment of First Embodiment

Figure 6:
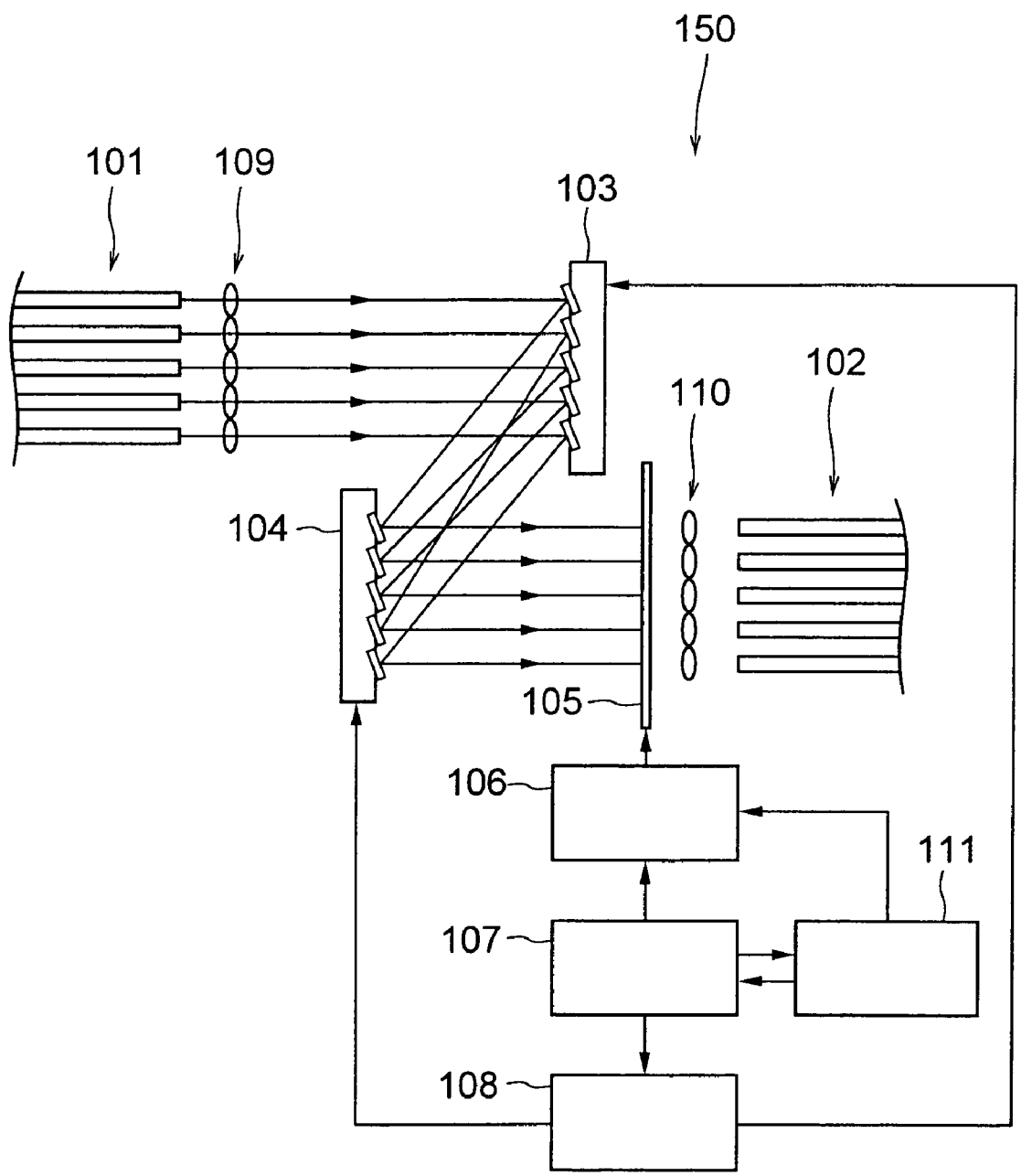
FIG. 6 is a diagram denoting a schematic structure of an optical switch according to a modified embodiment of the first embodiment of the present invention.

FIG. 6 denotes a schematic structure of an optical switch 150 according to a modified embodiment of the first embodiment. Same reference numerals are assigned to sections identical with sections in the first embodiment and the description is omitted to avoid repetition. The optical switch 150 differs from the optical switch in the first embodiment at a point that the optical switch 150 includes a power supply monitoring member 111.

The power supply monitoring member 111 monitors a voltage drop in a voltage of the power supply 107. For example, the mirror driving circuit 108 is designed and manufactured to operate normally at a power supply voltage not less than $V_m$. The shutter driving circuit 106 is designed and manufactured to operate normally at a power supply voltage not less than $V_s$ volts.

Further, due to some reason, sometimes the voltage of the power supply 107 drops below a suitable value. When the voltage of the power supply 107 is dropped to a predetermined voltage $V_0$, the power supply monitoring member 111 transmits an instruction signal to the shutter driving circuit 106. Accordingly, the shutter driving circuit 106 drives the shutter 105 to the first position. As a result, all the optical paths from the optical fibers for input 101 up to the optical fibers for output 102 are shielded collectively.

Here, it is desirable that the following condition (1) is fulfilled.

$$V_0 > V_m, \text{ and } V_0 > V_s \quad (1)$$

Accordingly, it is possible to shield by the shutter 105 all the optical paths connecting to the optical fibers for output 102, before the mirror driving circuit 108 stops operating normally.

Moreover, when the power supply 107 is a negative power supply, a negative voltage value is replaced by an absolute value. When a positive value replaced by the absolute value fulfils the condition (1), the power supply monitoring member 111 drives the shutter 105 to the first position. Accordingly, the shutter 105 shields collectively all the optical paths from the optical fibers for input 101 up to the optical fibers for output 102.

In the first embodiment, the shutter 105 itself functions to shield the optical paths collectively when the voltage supplied from the power supply 107 is not there. Whereas, in the modified embodiment of the first embodiment, the power supply monitoring member 111 monitors the voltage of the power supply 107. When the voltage of the power supply 107 is dropped to the predetermined voltage $V_0$, based on an instruction signal from the power supply monitoring member 111, the shutter driving circuit 106 drives the shutter 105 to attain the first position. Therefore, in the modified embodiment of the first embodiment a shutter having any of the following structures (A) and (B) can be used.

(A) A shutter identical with the shutters 105, 130, and 140 described in the first embodiment (B) A shutter having a self holding function with a facility to be latched For example, when the shutter having a structure in (B) is used, even if the voltage of the power supply 107 is dropped to the predetermined voltage $V_0$, the shutter itself maintains to be in the second position (position in which the light is not shielded) as it is. In other words, the shutter maintains a position in which the shutter is latched. When the voltage of power supply 107 is dropped to the predetermined voltage $V_0$, the power supply monitoring member 111 outputs an instruction signal to the shutter driving circuit 106. Accordingly, the shutter 105 is driven by the shutter driving circuit 106 to take the first position. For example, the shutter 105 (FIG. 2) described in the first embodiment, while continues to be in the second position (position in which the light is not shielded), the electrostatic force of attraction is required to be generated continuously by the drive electrode (not shown in the diagram). Whereas, the shutter 105 having the structure described in (B) maintains the second position (position in which the light is not shielded) in the latched condition. Accordingly, the voltage may not be supplied to the shutter 105 when the shutter 105 is in the latched condition. Therefore, if the shutter 105 having the structure described in (B) is used, electric power consumption is less as compared to electric power consumption when the shutter described in (A) is used.

In the modified embodiment of the first embodiment, when there is a voltage drop in the voltage of the power supply 107 due to some reason, the optical paths can be shielded collectively before electric control of the angle of each mirror of the first movable mirror array 103 and the angle of each mirror of the second movable mirror array 104 stops functioning. Accordingly, the light is not output to the optical fibers for output 102. As a result, the effect of preventing the malfunctioning of the optical switch 150, and consequently the malfunctioning of the optical communication system in which the optical switch 150 is used, is achieved.

Moreover, the shutter 105 in the modified embodiment of the first embodiment, similarly as the shutter in the first embodiment, maintains a condition in which the optical paths are shielded when the voltage supply from the power supply 107 is not there. The shutter 105 in the modified embodiment of the first embodiment may be disposed at any position in the optical path between the optical fibers for input 101 and the collimating lens 109, or between the collimating lens 109 and the movable mirror array 103, or between the collimating lens 110 and the optical fibers for output 102. Thus, it is possible to dispose the shutter at a suitable position according to a structure of the shutter.

Second Embodiment

Figure 7:
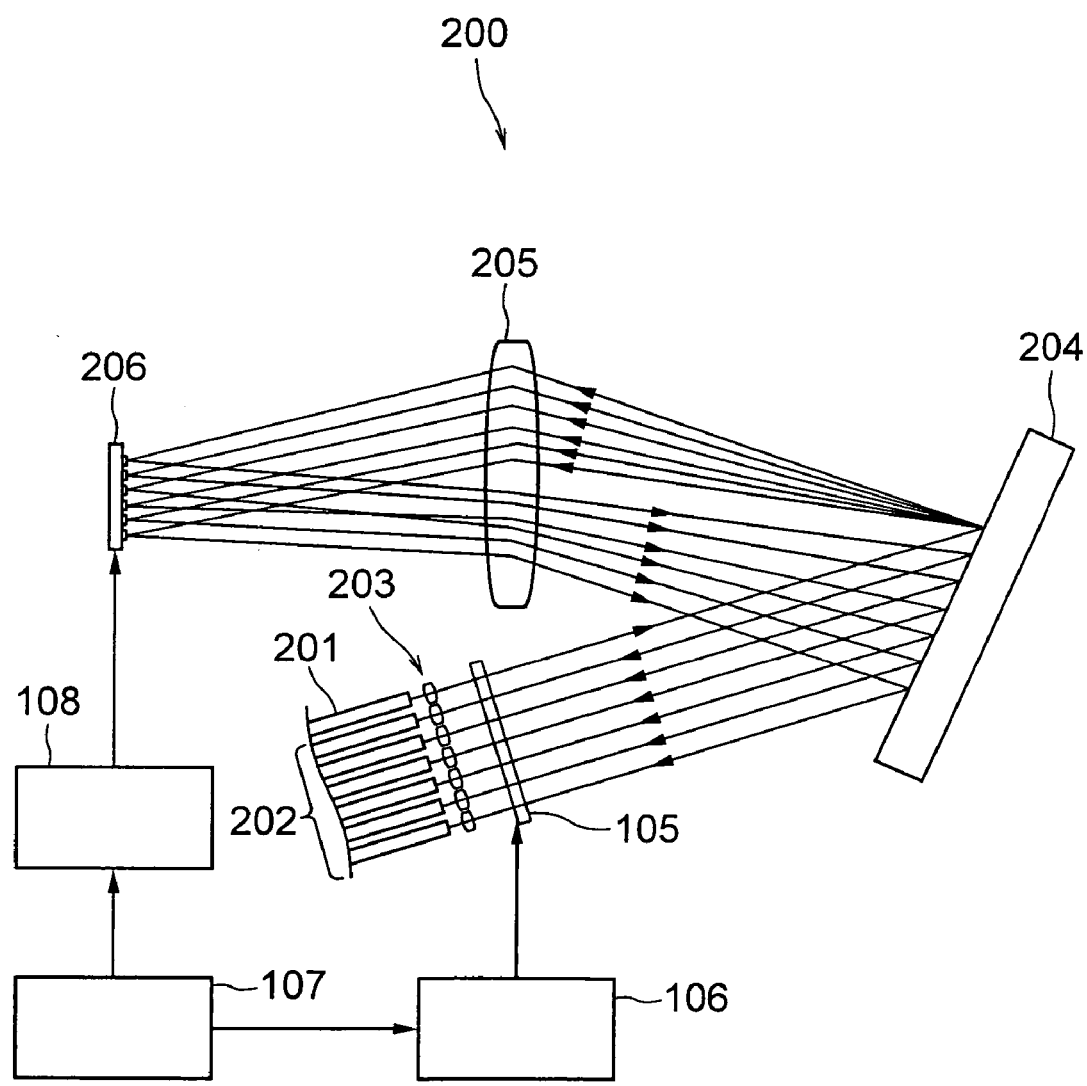
FIG. 7 is a diagram denoting a schematic structure of an optical switch according to a second embodiment of the present invention.

FIG. 7 denotes a schematic structure of an optical switch 200 according to a second embodiment of the present invention. Same reference numerals are assigned to sections identical with the sections in the first embodiment and the description is omitted to avoid repetition. An optical fiber for input 201 propagates light of plurality of wavelengths $\lambda 1$, $\lambda 2, \ldots, \lambda n$. A collimating lens 203 is disposed near an emitting end surface of the optical fiber for input 201. The collimating lens 203 includes a plurality of collimating lenses and each lens corresponds with one of the optical fiber for input 201 and optical fibers for output 202 which will be described later. Light emitted from the optical fiber for input 201 is incident on a corresponding collimating lens 203. The collimating lens 203 converts the light incident to a substantially parallel light and the substantially parallel light is emerged from the collimating lens 203. The collimating lens 203 corresponds to the optical coupling member. The light emerged from the collimating lens 203 is incident on the shutter 105.

The shutter 105 has a structure same as the structure of the shutter described in the first embodiment. In FIG. 7, the shutter 105 denotes the second position, in other words a position at which the light is allowed to pass through the optical path. The shutter 105 moves in a direction perpendicular to a paper surface in the diagram. Accordingly, the shutter 105 can switch selectively between the first position and the second position.

Light passed through the shutter 105 is incident on a diffraction grating 204. The diffraction grating 204 is a reflection type diffraction grating. The diffraction grating 204 corresponds to a spectroscope. Light incident on the diffraction grating 204 is reflected upon diffraction in different directions according to wavelengths $\lambda 1, \lambda 2, \ldots, \lambda n$. Due to this, the light incident on the diffraction grating 204 is separated spatially according to wavelengths $\lambda 1$, $\lambda 2, \ldots, \lambda n$. Light reflected in different directions according to the wavelength is irradiated on each mirror of a movable mirror array 206 by an image forming lens 205. The image forming lens 205 corresponds to a first lens.

It is desirable that the image forming lens 205 forms an image of an emitting end surface of the optical fiber for input 201 on a reflecting surface of each mirror of the movable mirror array 206. Accordingly, a light spot becomes small near a point of image forming in an area near the movable mirror array 206. Therefore, it is possible to reduce a size of the movable mirror array 206. Consequently, it is possible to realize a reduction in an overall size of the optical switch 200.

The movable mirror array 206 has one mirror for each of the diffracted wavelengths $\lambda 1, \lambda 2, \ldots, \lambda n$. As a result, in all there are n number of mirrors. A mirror corresponding with a wavelength $\lambda i$ (i=1~n) change an optical path such that the respective reflected light is directed in a desired direction.

Light reflected at each mirror of the movable mirror array 206, after passing once again through the image forming lens 205, is reflected by the diffraction grating 204. Light reflected is again incident on the shutter 105.

The reflected light is incident on the collimating lens 203 when the shutter 105 is in the second position, in other words, when the light is allowed to pass through the optical path. The collimating lens 203 includes a plurality of collimating lenses and each collimating lens corresponds with one of the plurality of optical fibers for output 202. The collimating lens 203 is disposed near an end surface of the optical fibers for output 202. The collimating lens 203 converges substantially parallel light which is incident, on an emitting end surface of the optical fibers for output 202.

An angle of each mirror of the movable mirror array 206 is electrically controlled by the mirror driving circuit 108. An optical path of light which is input from the optical fiber for input 201 can be changed as appropriate by controlling and changing the angle of each mirror of the movable mirror array 206. By changing the optical path of the light, it is possible to switch (optical switching) the optical fiber for output 202 at a destination of light which is input from the optical fiber for input 201.

The shutter 105 is driven by the shutter driving circuit 106. The movable mirror array 206 is driven by the mirror driving circuit 108. Moreover, the power supply 107 supplies a voltage to the mirror driving circuit 108 and the shutter driving circuit 106.

To start with, a situation when a suitable voltage is supplied from the power supply 107 to the mirror driving circuit 108 and the shutter driving circuit 106 will be described. When the suitable voltage is supplied, an electrostatic force (attracting force) is generated in the drive electrode. When the electrostatic force acts, the beam portion 122 (FIG. 2) is deformed and bent in a direction of the drive electrode. The bent status of the beam portion 122 corresponds to the second position of the shutter 105. In the second position, the light shielding portion 123 is retracted from the optical path to the outside of the optical path. Accordingly, the light can be allowed to pass through all optical paths from the optical fiber 201 for input up to the optical fibers 202 for output.

Correspondingly, a situation when the voltage is not supplied from the power supply 107 to the mirror driving circuit 108 and the shutter driving circuit 106 will be described below. This situation corresponds to the situation of a sudden stop due to an electric power failure etc. of a power supply of an optical communication system in a telephone exchange where the optical switch 200 is provided. With no voltage supplied from the power supply 107, the angle of each mirror in the movable mirror array 206 is not at all controlled electrically. Therefore, it is not possible to control as to toward which optical fiber for output 202 the light reflected at the movable mirror array 206 is to be directed.

In the second embodiment, when the voltage is not supplied from the power supply 107 to the mirror driving circuit 108 and the shutter driving circuit 106, the drive electrode (not shown in the diagram) of the shutter 105 does not generate the electrostatic force (attracting force). When the electrostatic force does not act, the beam portion 122 is not bent and is in a substantially straight line form, i.e. a form shown in FIG. 2. The straight line form of the beam portion 122 corresponds to the first position of the shutter 105. In the first position, the light shielding portion 123 is inserted into the optical path. Further, the light shielding portion 123 shields collectively, all optical paths from the optical fiber for input 201 up to the optical fibers for output 202. Due to this, the light is not output to the optical fiber for output 202. As a result, an effect of preventing the malfunctioning of the optical switch 200, and consequently the malfunctioning of an optical communication system in which the optical switch 200 is used, is achieved.

Moreover, a direction of movement of the light shielding portion 123 of the shutter 105 is not restricted to be the direction perpendicular to the paper surface. The light shielding portion 123 of the shutter 105 may be moved in a direction parallel to the paper surface.

In the second embodiment, the shutter 105 may be disposed at any position in an optical path between the collimating lens 203 and the diffraction grating 204, or between the diffraction grating 204 and the movable mirror array 206. Thus, it is possible to dispose the shutter 105 at a suitable position according to the structure of the shutter.

It is desirable that the shutter 105 is disposed near the movable mirror array 206. As described above, the image forming lens 205 forms an image of the emitting end surface of the optical fiber for input 201 on the reflecting surface of each mirror of the movable mirror array 206. Accordingly, a light spot becomes small near a point of image forming in the area near the movable mirror array 206. Therefore, it is possible to reduce the size of the movable mirror array 206. Consequently, it is possible to realize the reduction in a size of the shutter 105. Particularly, with the reduction in the size of the shutter 105, it is possible to reduce weight of the shutter 105. Due to the reduction in the weight of the shutter 105, it is possible to speed up an opening and closing operation of the shutter 105. As a result, it is possible to realize a shortening of time from a point where the shutter 105 is opened to a point where the optical path is completely shielded.

Moreover, as described in the first embodiment, the movable mirror array 206 is manufactured by using the MEMS technology in general. For example, a structure of a movable mirror is disclosed in Japanese Patent Application Laid-open Publication No. 2003-57575. The movable mirror has a structure in which two silicon base plates are stuck together and a frame is remained around a mirror surface. The frame may stick out by not less than 0.5 mm from a mirror surface.

Thus, the size of the shutter 105 as well can be reduced by using similarly the MEMS technology. A frame is remained on a silicon base plate which supports the shutter 105. The frame may stick out by not less than 0.5 mm from a shutter surface.

As the shutter 105 is near from the movable mirror array 206, the size of the shutter can be reduced. However, if a distance between the shutter 105 and the movable mirror array 206 is not more than 1 mm, there is a possibility that the shutter 105 and the movable mirror array 206 interfere spatially due to the frames of the shutter 105 and the movable mirror array 206.

Therefore, it is desirable that the distance between the shutter 105 and the movable mirror array 206 is not less than 2 mm. Accordingly, in addition to the reduction in the size of the shutter 105, the shutter 105 can be assembled with ease.

Third Embodiment

Figure 8:
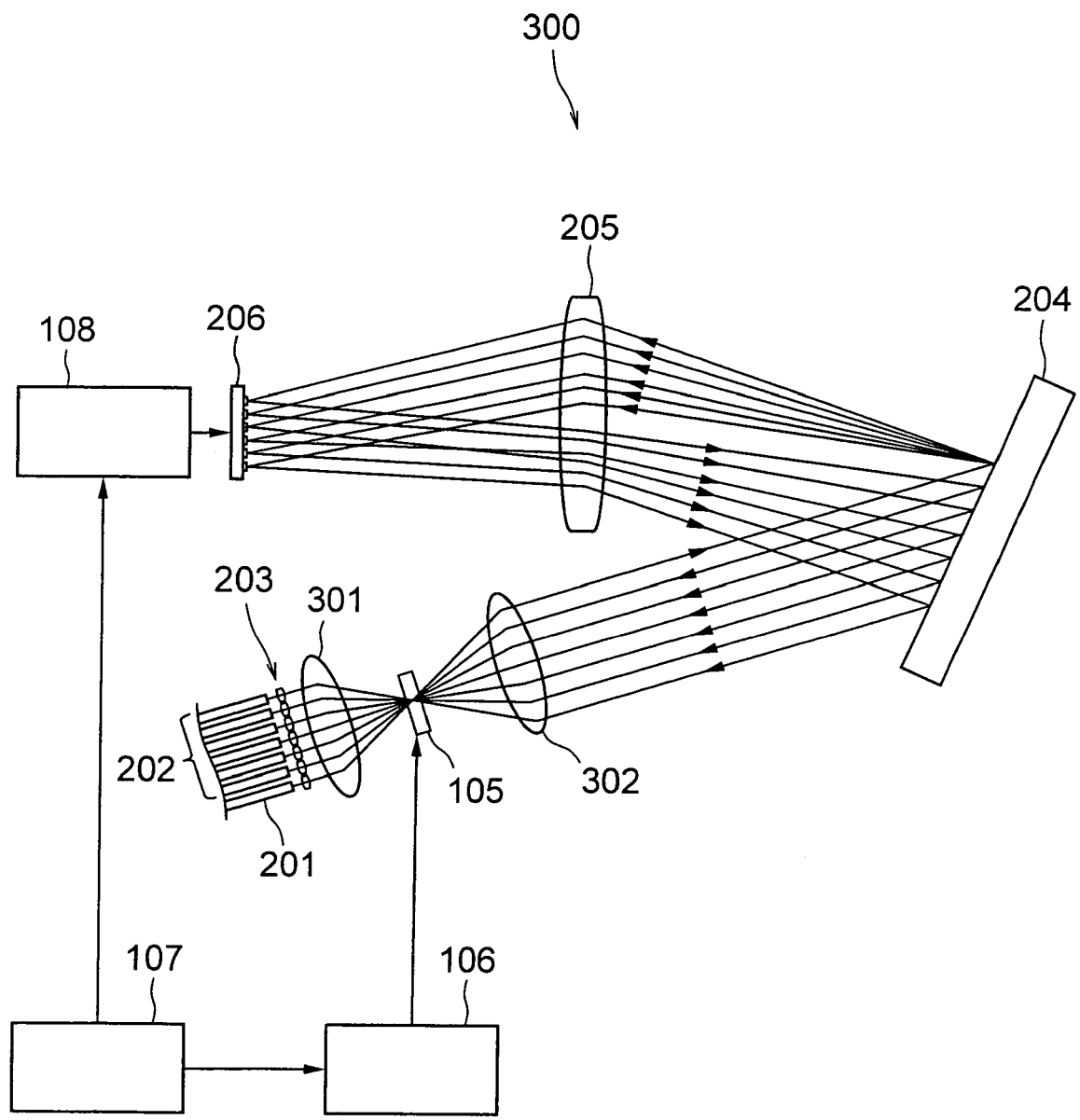
FIG. 8 is a diagram denoting a schematic structure of an optical switch according to a third embodiment of the present invention.

FIG. 8 denotes a schematic structure of an optical switch 300 according to a third embodiment of the present invention. The optical switch 300 differs from the optical switch 200 in the second embodiment at a point that the optical switch 300 has a relay optical system. Same reference numerals are assigned to sections identical with the sections in the first embodiment and the second embodiment, and the description is omitted to avoid repetition. An operation of optical switching is similar to the operation of optical switching in the second embodiment.

The relay optical system is provided in an optical path between the collimating lens 203 and the diffraction grating 204. The relay optical system includes a third lens 301 having a positive refractive power and a fourth lens 302 having a positive refractive power. The third lens 301 and the fourth lens 304 are disposed such that a focal position of the third lens 301 and a focal position of the fourth lens 302 overlap substantially. Accordingly, all optical paths connecting to the optical fiber for input 201 and the optical fibers for output 202 intersect at a point in the focal position.

Further, the shutter 105 is disposed at a position where the optical paths intersect at the point, in other words at the focal position. The light shielding portion 123 (not shown in the diagram) of the shutter 105 moves in a direction perpendicular to the paper surface. FIG. 8 denotes the second position of the shutter 105, i.e. a situation in which the shutter 105 allows the light to pass through the optical path.

To start with, a situation when a suitable voltage is supplied from the power supply 107 to the mirror driving circuit 108 and the shutter driving circuit 106 will be described. When the suitable voltage is supplied, the drive electrode generates the electrostatic force (attracting force). When the electrostatic force acts, the beam portion 122 is deformed and bent in the direction of the drive electrode. The bent status of the beam portion 122 corresponds to the second position of the shutter 105. In the second position, the light shielding portion 123 is retracted from the inside of the optical path to the outside of the optical path. Accordingly, it is possible to allow to pass light through all optical paths from the optical fiber for input 201 up to the optical fibers for output 202.

Correspondingly, a situation when the voltage is not supplied from the power supply 107 to the mirror driving circuit 108 and the shutter driving circuit 106 will be described below. With no voltage supplied from the power supply 107, the angle of each mirror in the movable mirror array 206 is not at all controlled electrically. Therefore, it is not possible to control as to toward which optical fibers for output 202, the light reflected at the movable mirror array 206 is to be directed.

In the third embodiment, when the voltage is not supplied from the power supply 107 to the mirror driving circuit 108 and the shutter driving circuit 106, the drive electrode (not shown in the diagram) of the shutter 105 does not generate the electrostatic force (attracting force). When the electrostatic force does not act, the beam portion 122 is not bent and is in a substantially straight line form, i.e. a form shown in FIG. 2. The straight line form of the beam portion 122 corresponds to the first position of the shutter 105. In the first position, the light shielding portion 123 is inserted into the optical path. Further, the light shielding portion 123 shields collectively, all optical paths from the optical fiber for input 201 up to the optical fibers for output 202. Accordingly, the light is not output to the optical fibers for output 202. As a result, the effect of preventing the malfunctioning of the optical switch 300, and consequently the malfunctioning of an optical communication system in which the optical switch 300 is used, is achieved.

In the third embodiment, the shutter 105 is disposed at a position where the optical paths in the relay optical system intersect at one point, i.e. at the focal position of the lens 301 and the lens 302. Therefore, it is possible to realize the reduction in the size of the shutter 105. Particularly, with the reduction in the size of the shutter 105, it is possible to reduce the weight of the shutter 105. Due to the reduction in the weight of the shutter 105, it is possible to speed up the opening and closing operation of the shutter 105. As a result, it is possible to realize the shortening of time from a point where the shutter 105 is opened to the point where the optical path is completely shielded.

Moreover, it is possible to use one lens in common for the lens 302 and the image forming lens 205. Accordingly, it is possible to reduce the number of lenses.

Fourth Embodiment

Figure 9:
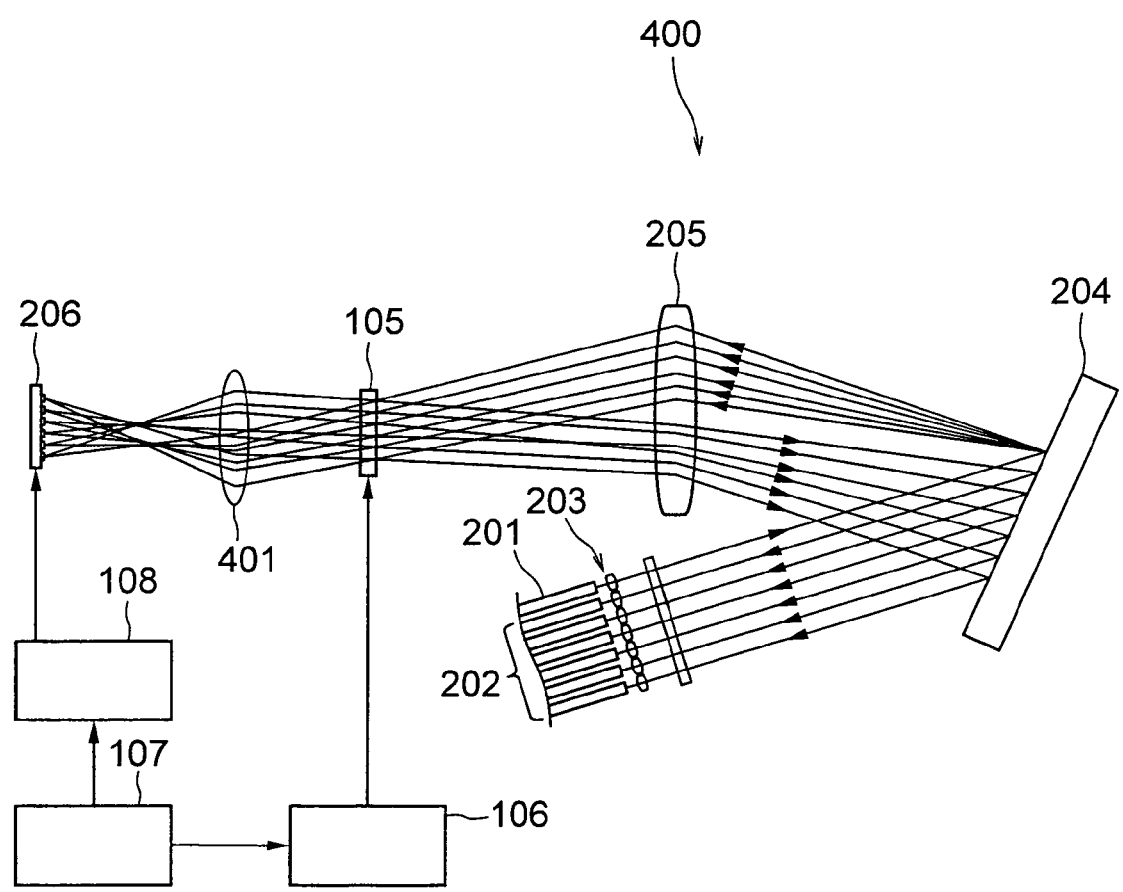
FIG. 9 is a diagram denoting a schematic structure of an optical switch according to a fourth embodiment of the present invention.

FIG. 9 denotes a schematic structure of an optical switch 400 according to a fourth embodiment of the present invention. The optical switch 400 differs from the optical switch 200 in the second embodiment at a point that the optical switch 400 has a second lens 401. Same reference numerals are assigned to sections identical with the sections in the first embodiment and the second embodiment, and the description is omitted to avoid repetition. An operation of optical switching is similar to the operation of optical switching in the second embodiment.

The second lens 401 is disposed near an image forming surface of the image forming lens 205. The second lens 401 once again forms an image of the emitting end surface of the optical fiber 201 for input which is formed at the image forming lens 205. The movable mirror array 206 is disposed near an image forming surface of the second lens 401.

The shutter 105 is disposed near the image forming surface of the image forming lens 205. The light shielding portion 123 (FIG. 2) of the shutter 105 moves in a direction perpendicular to the paper surface. FIG. 9 denotes the second position of the shutter 105, i.e. a condition in which the shutter 105 allows the light to pass through the optical path.

To start with, a situation when a suitable voltage is supplied from the power supply 107 to the mirror driving circuit 108 and the shutter driving circuit 106 will be described. When the suitable voltage is supplied, the drive electrode generates the electrostatic force (attracting force). When the electrostatic force acts, the beam portion 122 is deformed and bent in the direction of the drive electrode. The bent status of the beam portion 122 corresponds to the second position of the shutter 105. In the second position, the light shielding portion 123 is retracted from the inside of the optical path to the outside of the optical path. Accordingly, it is possible to allow the light to pass through all optical paths from the optical fiber for input 201 up to the optical fibers for output 202.

Correspondingly, a situation when the voltage is not supplied from the power supply 107 to the mirror driving circuit 108 and the shutter driving circuit 106 will be described below. With no voltage supplied from the power supply 107, the angle of each mirror in the movable mirror array 206 is not at all controlled electrically. Therefore, it is not possible to control as to toward which optical fibers for output 202, the light reflected at the movable mirror array 206 is to be directed.

In the fourth embodiment, when the voltage is not supplied from the power supply 107 to the mirror driving circuit 108 and the shutter driving circuit 106, the drive electrode (not shown in the diagram) of the shutter 105 does not generate the electrostatic force (attracting force). When the electrostatic force does not act, the beam portion 122 is not bent and is in a substantially straight line form, i.e. a form shown in FIG. 2. The straight line form of the beam portion 122 corresponds to the first position of the shutter 105. In the first position, the light shielding portion 123 is inserted into the optical path. Further, the light shielding portion 123 shields collectively, all optical paths from the optical fiber for input 201 up to the optical fibers for output 202. Accordingly, the light is not output to the optical fibers for output 202. As a result, the effect of preventing the malfunctioning of the optical switch 400, and consequently the malfunctioning of an optical communication system in which the optical switch 400 is used, is achieved.

In the fourth embodiment, the shutter 105 is disposed near the position where the image forming lens 205 forms an image of the emitting end surface of the optical fiber for input 201. Accordingly, it is possible to realize the reduction in the size of the shutter 105. Particularly, with the reduction in the size of the shutter 105, it is possible to reduce the weight of the shutter 105. Due to the reduction in the weight of the shutter 105, it is possible to speed up the opening and closing operation of the shutter 105. As a result, it is possible to realize the shortening of the time from the point where the shutter 105 is opened to the point where the optical path is completely shielded.

Moreover, the movable mirror array 206 is disposed at an image forming position of the second lens 401. Therefore, the shutter 105 and the movable mirror array 206 do not interfere spatially. As a result, an efficiency of assembling is improved.

Modified Embodiment of Second, Third, and the Fourth Embodiments

A modified embodiment of the second, third and the fourth embodiments will be described below. The modified embodiment of the second, third, and the fourth embodiments, similar to the modified embodiment of the first embodiment, has the power supply monitoring member 111 (FIG. 6). The power supply monitoring member 111 monitors the voltage drop in the voltage of the power supply 107. For example, the mirror driving circuit 108 is designed and manufactured to operate normally at a power supply voltage not less than $V_m$. The shutter driving circuit 106 is designed and manufactured to operate normally at a power supply voltage not less than $V_s$.

Sometimes the voltage of the power supply 107 drops below a suitable value due to some reason. When the voltage of the power supply 107 is dropped to a predetermined voltage $V_0$, the power supply monitoring member 111 transmits an instruction signal to the shutter driving circuit 106. Accordingly, the shutter driving circuit 106 drives the shutter 105 to the first position. As a result, all optical paths from the optical fiber for input 201 up to the optical fiber for output 202 are shielded collectively.

Here, it is desirable that the condition (1) mentioned above is fulfilled. Accordingly, it is possible to shield by the shutter 105 all the optical paths connecting to the optical fibers for output 202, before the mirror driving circuit 108 stops operating normally.

Moreover, when the power supply 107 is a negative power supply, a negative voltage value is replaced by an absolute value. When a positive value replaced by the absolute value fulfils the condition (1), the power supply monitoring member 111 drives the shutter 105 to the first position. Accordingly, the shutter 105 shields collectively all the optical paths from the optical fiber for input 201 up to the optical fibers for output 202.

In the second, third, and the fourth embodiments, the shutter 105 itself functions to shield the optical paths collectively when the voltage supplied from the power supply 107 is stopped. Whereas, in the modified embodiment of the second, third, and the fourth embodiments, the power supply monitoring member 111 monitors the voltage of the power supply 107. When the voltage of the power supply 107 is dropped to the predetermined voltage $V_0$, based on the instruction signal from the power supply monitoring member 111, the shutter driving circuit 106 drives the shutter 105 to take the first position. Therefore, in the modified embodiment of the second, third, and the fourth embodiments, a shutter having any of the following structures (A) and (B) can be used.

(A) A shutter identical with the shutters 105, 130, and 140 described in the first embodiment (B) A shutter having a self holding function with a facility to be latched For example, when the shutter having the structure in (B) is used, even if the voltage of the power supply 107 is dropped to the predetermined voltage $V_0$, the shutter itself maintains to be in the second position (position in which the light is not shielded) as it is. In other words, the shutter maintains a position in which the shutter is latched. When the voltage of the power supply 107 is dropped to the predetermined voltage $V_0$, the power supply monitoring member 111 outputs an instruction signal to the shutter driving circuit 106. Accordingly, the shutter 105 is driven by the shutter driving circuit 106 to take the first position. For example, as described in the first embodiment, the shutter 105 (FIG. 2) while continues to be in the second position (position in which the light is not shielded), the electrostatic force of attraction is required to be generated continuously by the drive electrode (not shown in the diagram). Whereas, the shutter having the structure described in (B) maintains the second position (position in which the light is not shielded) in the latched condition. Accordingly, the voltage may not be supplied to the shutter when the shutter is in the latched condition. Therefore, if the shutter having the structure described in (B) is used, electric power consumption is less as compared to electric power consumption when the shutter described in (A) is used.

In the modified embodiment of the second, third, and the fourth embodiment, when there is a voltage drop in the voltage of the power supply 107 due to some reason, the optical paths can be shielded collectively before electric control of the angle of each mirror of the movable array 206 stops functioning. Therefore the light is not output to the optical fibers for output 202. As a result, the effect of preventing the malfunctioning of the optical switch and consequently the malfunctioning of the optical communication system in which the optical switch is used is achieved.

Moreover, the shutter in the modified embodiment of the second, third, and the fourth embodiments, may be disposed at any position in the optical path between the optical fiber for input 201 and the optical fibers for output 202. Thus, it is possible to dispose the shutter at a suitable position according to the structure of the shutter.

Moreover, in all the first, second, third, and the fourth embodiments, the optical fibers for input 101 and 201, and the optical fibers for output 102 and 202, are not restricted to optical fibers and may be structured by an optical guided wave path.

Moreover, any driving force such as an electromagnetic force, an electrostatic force, a piezoelectric effect, and heat can be used as a driving force for driving the shutters 105, 130, and 140.

Furthermore, in the first, second, third, and the fourth embodiments, one shutter shields all light beams. However, the present invention is not restricted to only one shutter shielding the light beams and the optical switch can also be structured such that a plurality of shutters shields all the light beams by operating jointly.

In addition, a case in which the movable mirror array is used as a member for changing the optical path is described. However, other objects, such as elements which can change the optical path like a liquid crystal and an electro-optical element, can be used. The movable mirror array, unlike a binary digital element, can perform an analog high resolution optical path change operation. Therefore, the movable mirror array is advantageous for making a large-scale optical switch, such as by increasing the number of fibers. Accordingly, it is easy to have an optical fiber array having a two-dimensional structure.

Next, further embodiments from a fifth embodiment to a twenty second embodiment of the present invention will be described below. In the embodiments from the fifth embodiment to the twenty second embodiment, same reference numerals are assigned to sections identical with sections in the embodiments from the first embodiment to the fourth embodiment and the description is omitted to avoid repetition.

Fifth Embodiment

Figure 10:
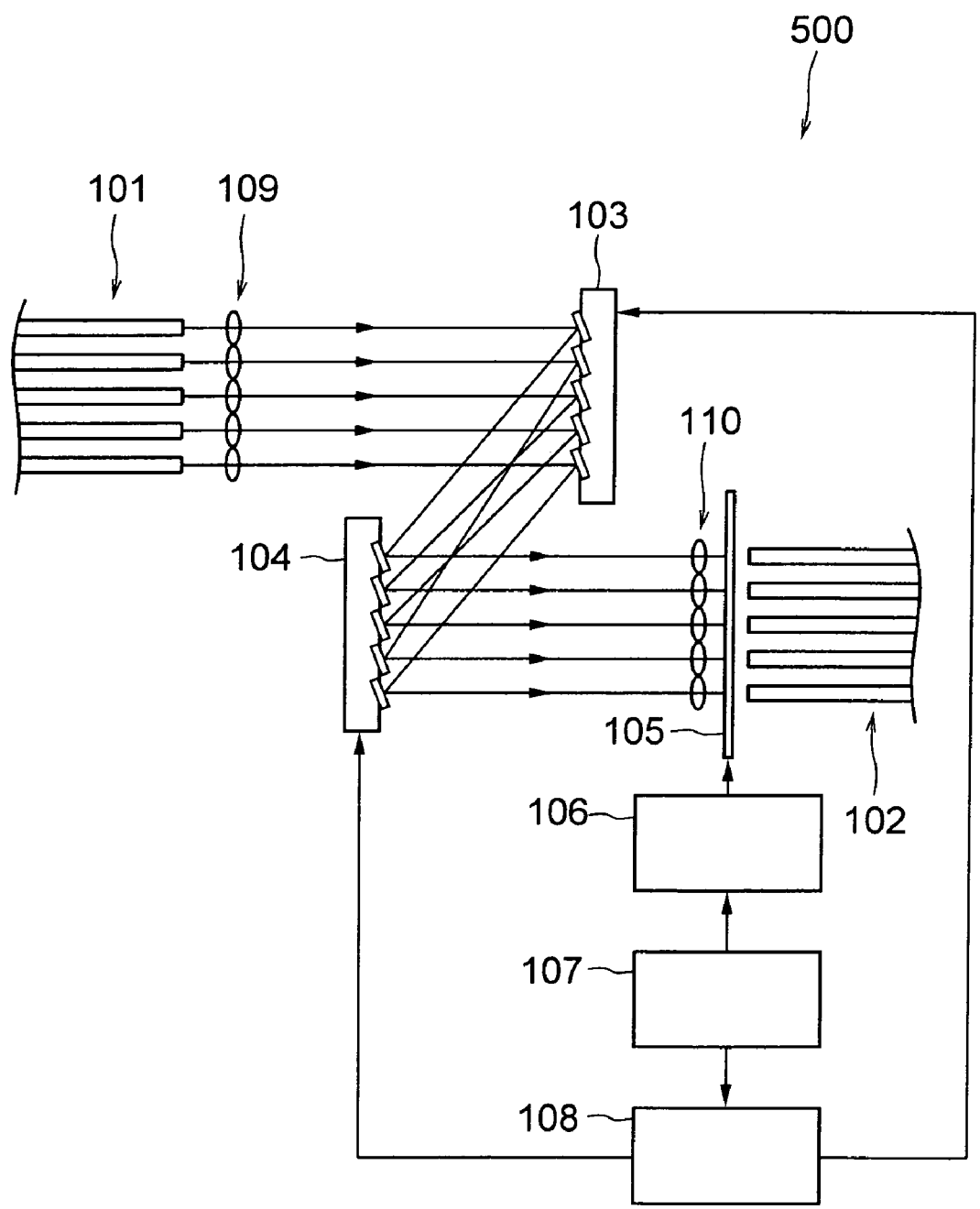
FIG. 10 is a diagram denoting a schematic structure of an optical switch according to a fifth embodiment of the present invention.

FIG. 10 denotes a schematic structure of an optical switch 500 according to the fifth embodiment. In the fifth embodiment, the optical switch 500 includes a plurality of optical fibers for input 101 and a plurality of optical fibers for output 102. Further, in the fifth embodiment, the shutter 105 is disposed between the collimating lens 110 and the plurality of optical fibers for output 102. Accordingly, a degree of freedom of disposing the shutter 105 is improved.

Sixth Embodiment

Figure 11:
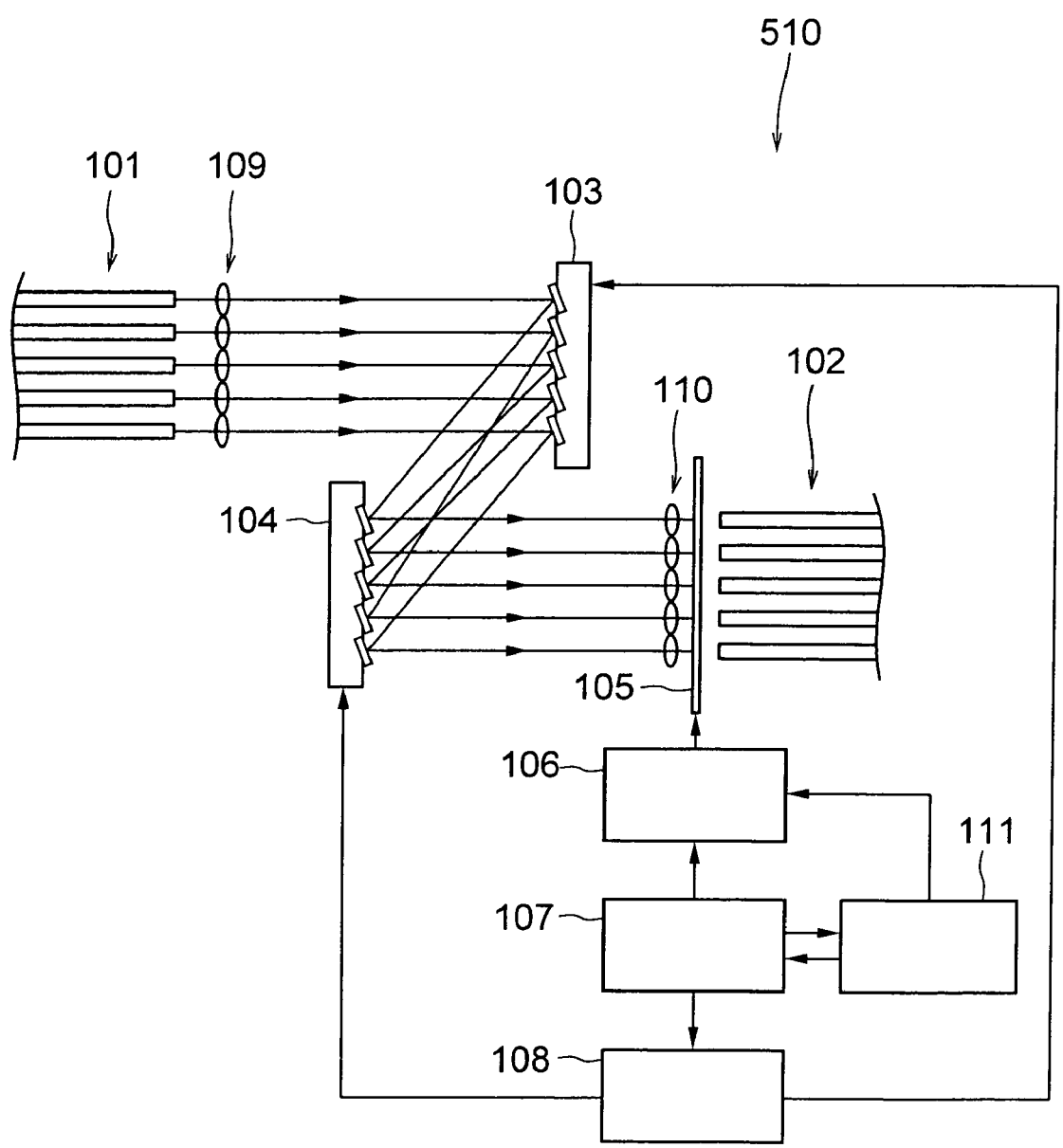
FIG. 11 is a diagram denoting a schematic structure of an optical switch according to a sixth embodiment of the present invention.

FIG. 11 denotes a schematic structure of an optical switch 510 according to the sixth embodiment. In the sixth embodiment, the optical switch 510 includes the plurality of optical fibers for input 101 and the plurality of optical fibers for output 102. In the sixth embodiment, in addition to a structure in the fifth embodiment, the optical switch 510 includes the power supply monitoring member 111. Accordingly, an effect similar to the effect achieved by the modified embodiment of the first embodiment is achieved.

Seventh Embodiment

Figure 12:
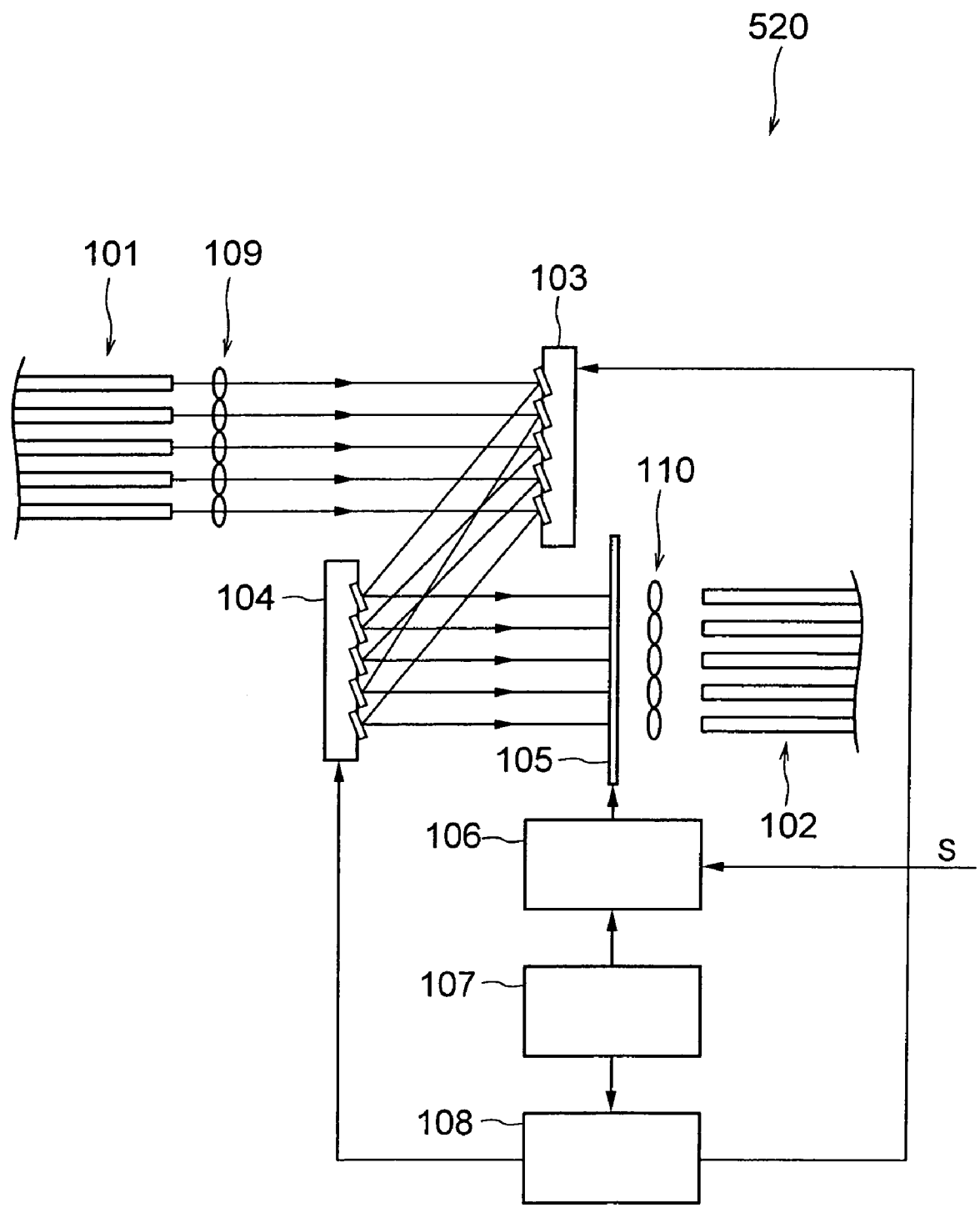
FIG. 12 is a diagram denoting a schematic structure of an optical switch according to a seventh embodiment of the present invention.

FIG. 12 denotes a schematic structure of an optical switch 520 according to the seventh embodiment. In the seventh embodiment, the optical switch 520 includes the plurality of optical fibers for input 101 and the plurality of optical fibers for output 102. In the seventh embodiment, the shutter driving circuit 106 drives the shutter 105 based on a control signal S which is sent from an outside of the optical switch 520. The shutter 105 shields the optical paths collectively.

Accordingly, all optical signals can be shielded. Therefore, while building a network in the beginning and while examining the network by using the optical switch 520, the operations can be performed efficiently.

Eighth Embodiment

Figure 13:
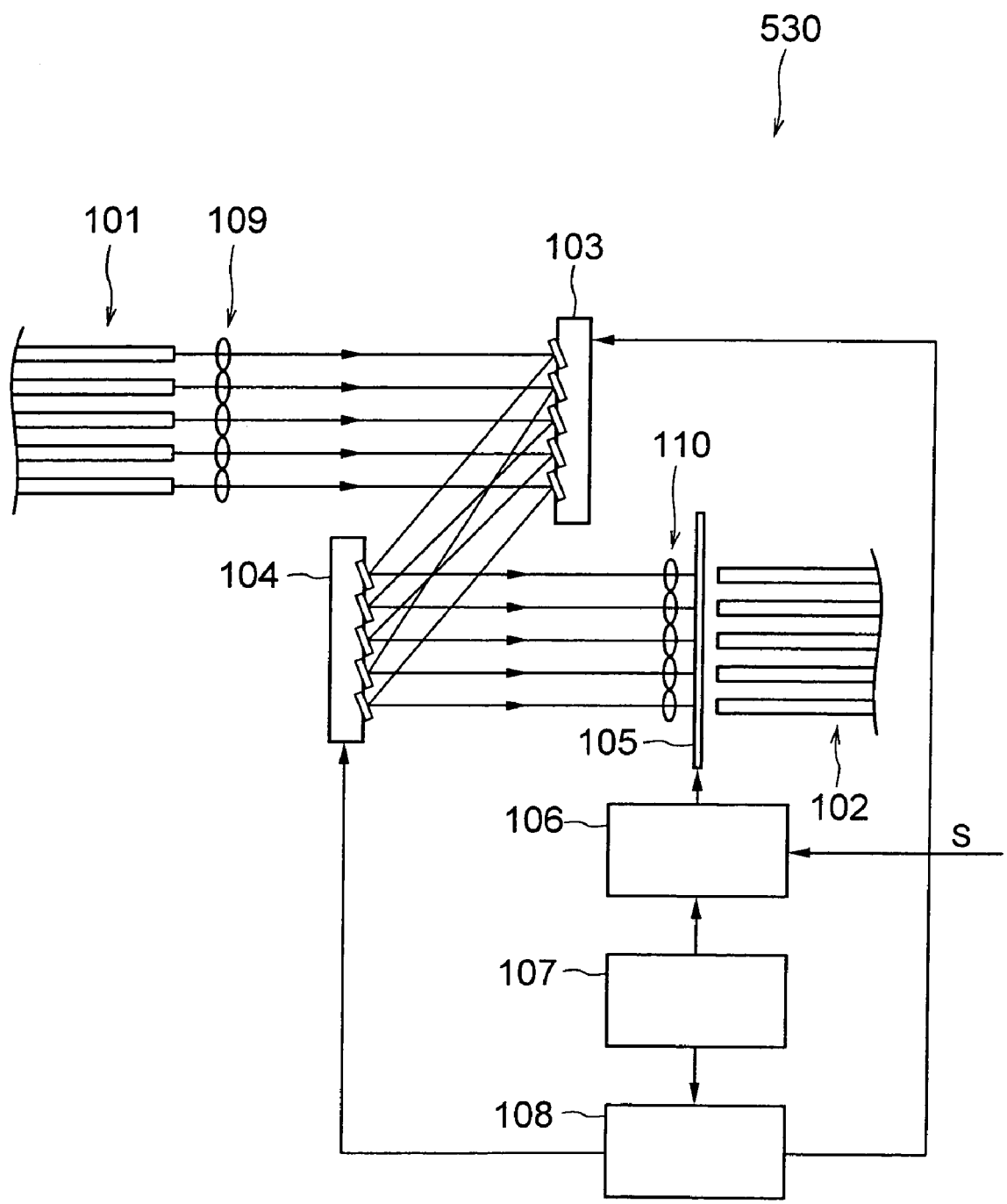
FIG. 13 is a diagram denoting a schematic structure of an optical switch according to an eighth embodiment of the present invention.

FIG. 13 denotes a schematic structure of an optical switch 530 according to the eighth embodiment. In the eighth embodiment, the optical switch 530 includes the plurality of optical fibers for input 101 and the plurality of optical fibers for output 102. In the eighth embodiment, the shutter 105 is disposed between the collimating lens 110 and the plurality of optical fibers for output 102.

Further, similarly as in the seventh embodiment, the shutter driving circuit 106 is controlled from outside by the control signal S.

Accordingly, all optical signals can be shielded. Therefore, while building a network in the beginning and while examining the network by using the optical switch 530, the operations can be performed efficiently.

Ninth Embodiment

Figure 14:
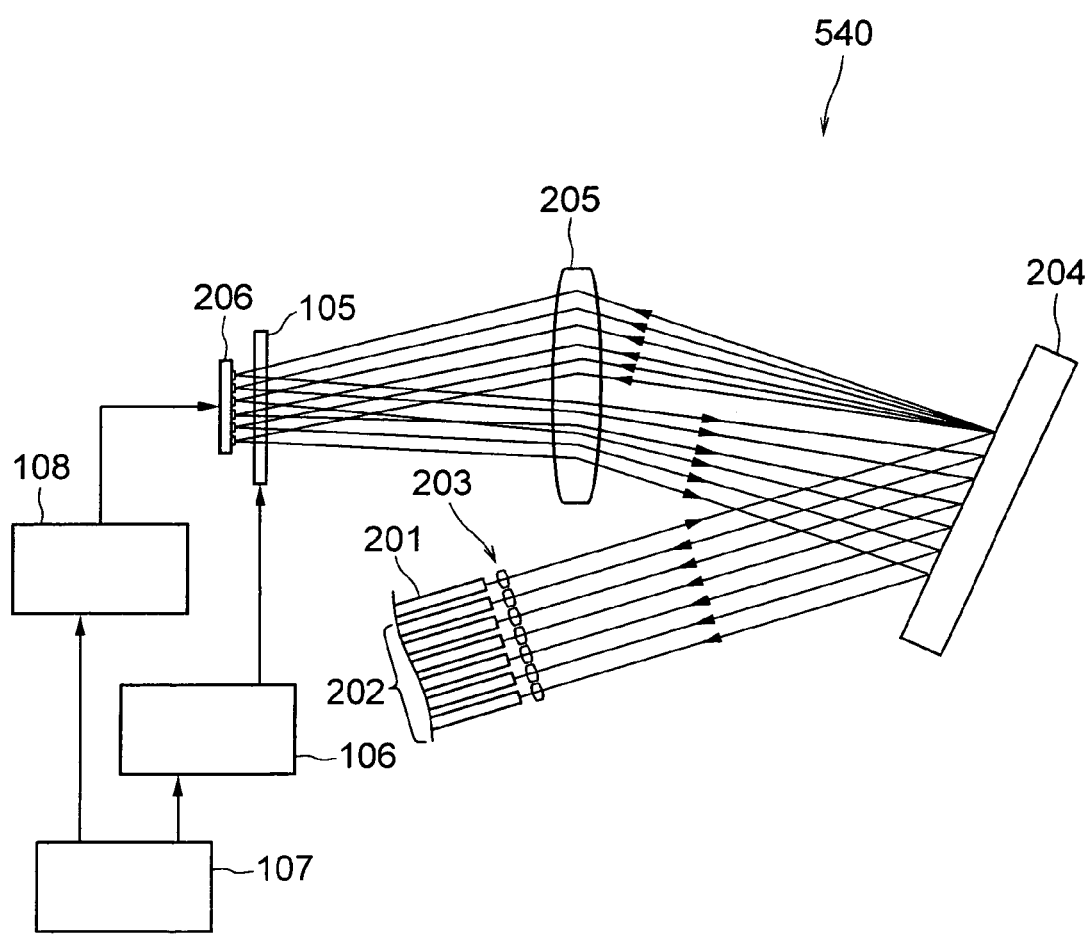
FIG. 14 is a diagram denoting a schematic structure of an optical switch according to a ninth embodiment of the present invention.

FIG. 14 denotes a schematic structure of an optical switch 540 according to the ninth embodiment. In the ninth embodiment, the optical switch 540 includes one optical fiber for input 201 and a plurality of optical fibers for output 202. In the ninth embodiment, as compared with the seventh embodiment, the shutter 105 is disposed between the diffraction grating 204 and the movable mirror array 206. Accordingly, the degree of freedom of disposing the shutter 105 is improved. Moreover, the size of the shutter 105 can be reduced.

Tenth Embodiment

Figure 15:
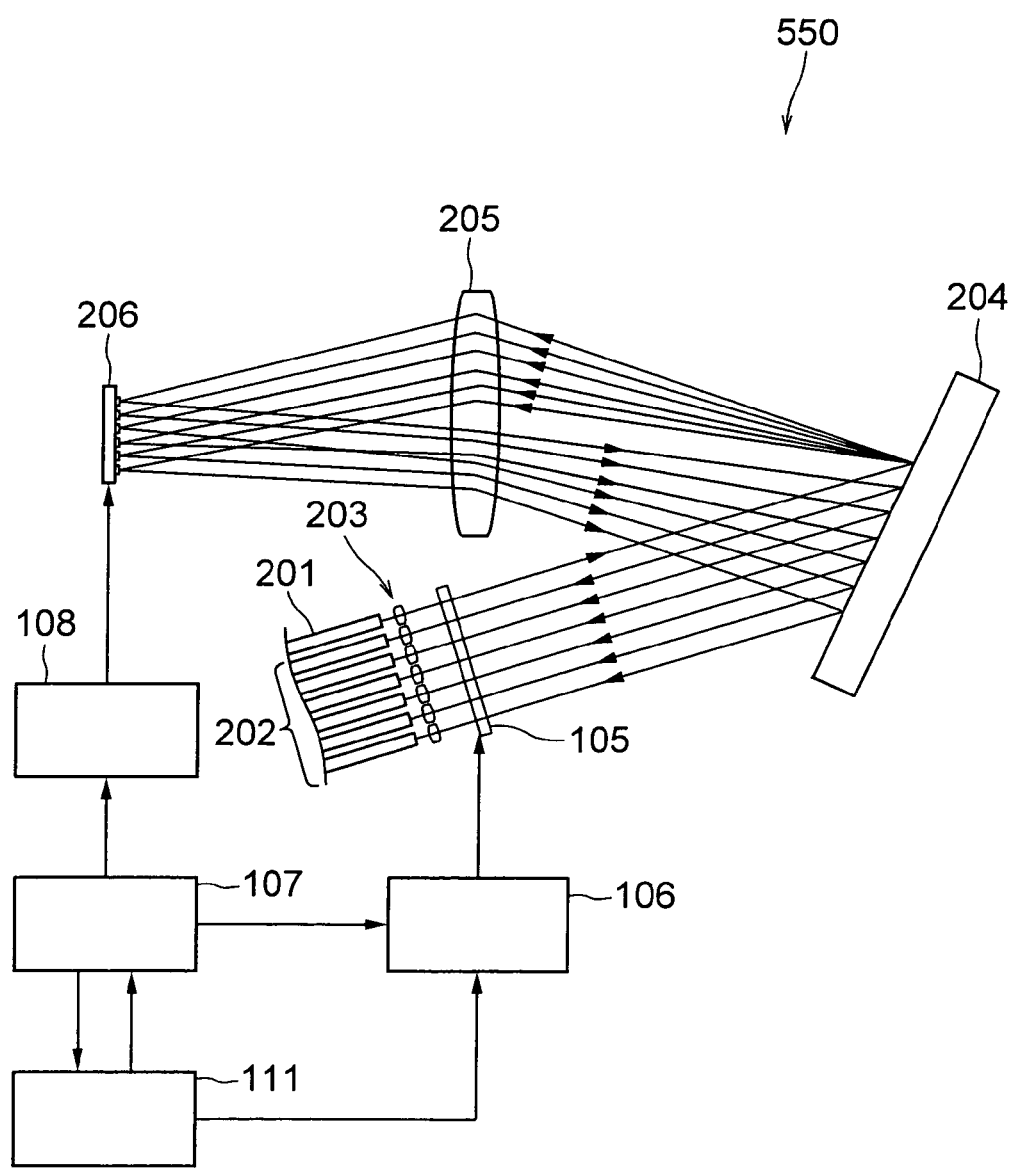
FIG. 15 is a diagram denoting a schematic structure of an optical switch according to a tenth embodiment of the present invention.

FIG. 15 denotes a schematic structure of an optical switch 550 according to the tenth embodiment. In the tenth embodiment, the optical switch 550 includes one optical fiber for input 201 and the plurality of optical fibers for output 202. In the tenth embodiment, in addition to the structure in the second embodiment, the optical switch 550 further includes the power supply monitoring member 111. Accordingly, an effect similar to the effect achieved in the modified embodiment of the first embodiment is achieved.

Eleventh Embodiment

Figure 16:
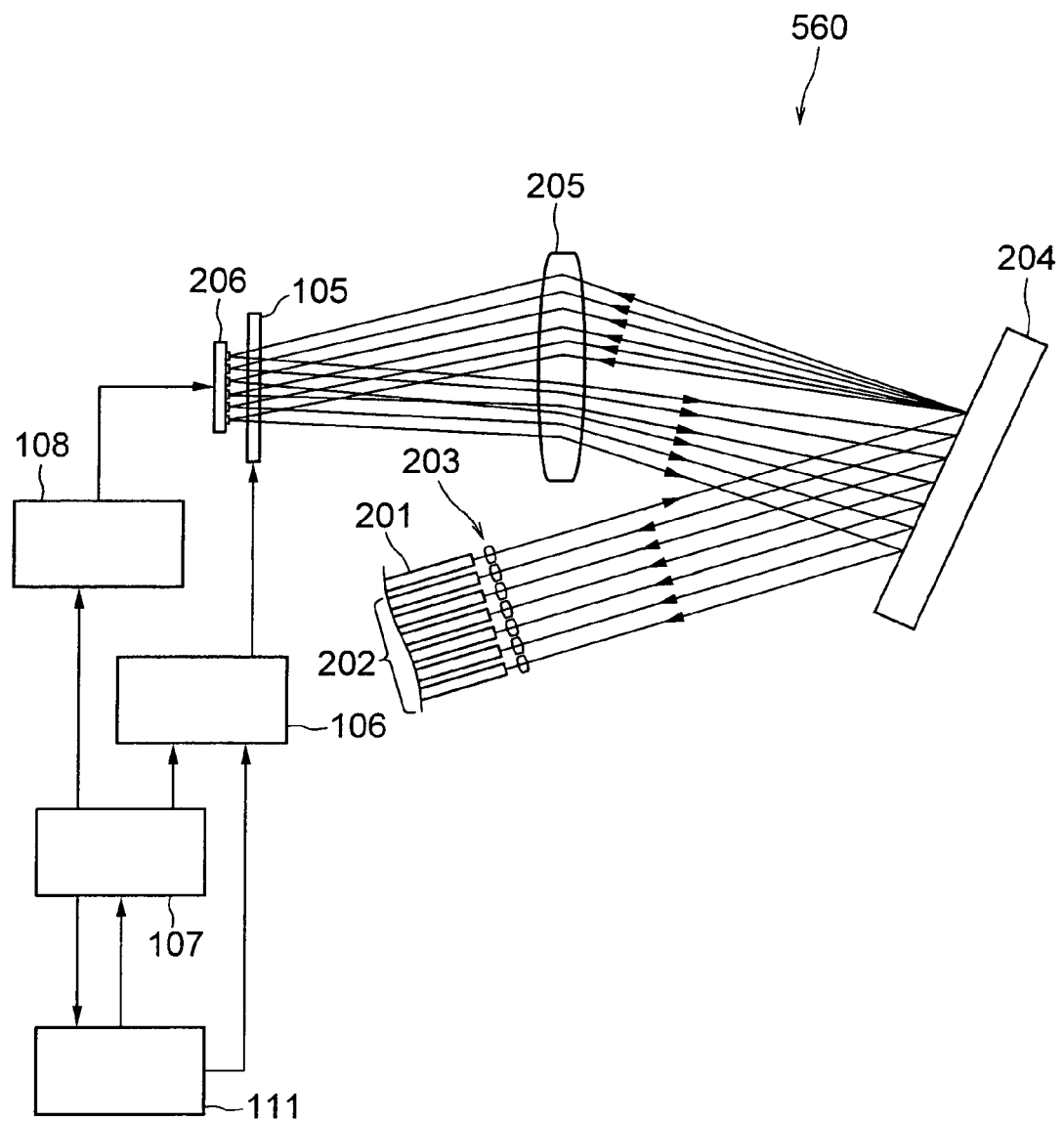
FIG. 16 is a diagram denoting a schematic structure of an optical switch according to an eleventh embodiment of the present invention.

FIG. 16 denotes a schematic structure of an optical switch 560 according to the eleventh embodiment. In the eleventh embodiment, the optical switch 560 includes one optical fiber for input 201 and the plurality of optical fibers for output 202. In the eleventh embodiment, in addition to the structure in the ninth embodiment, the optical switch 560 further includes the power supply monitoring member 111. According an effect similar to the effect achieved in the modified embodiment of the first embodiment can be achieved.

Twelfth Embodiment

Figure 17:
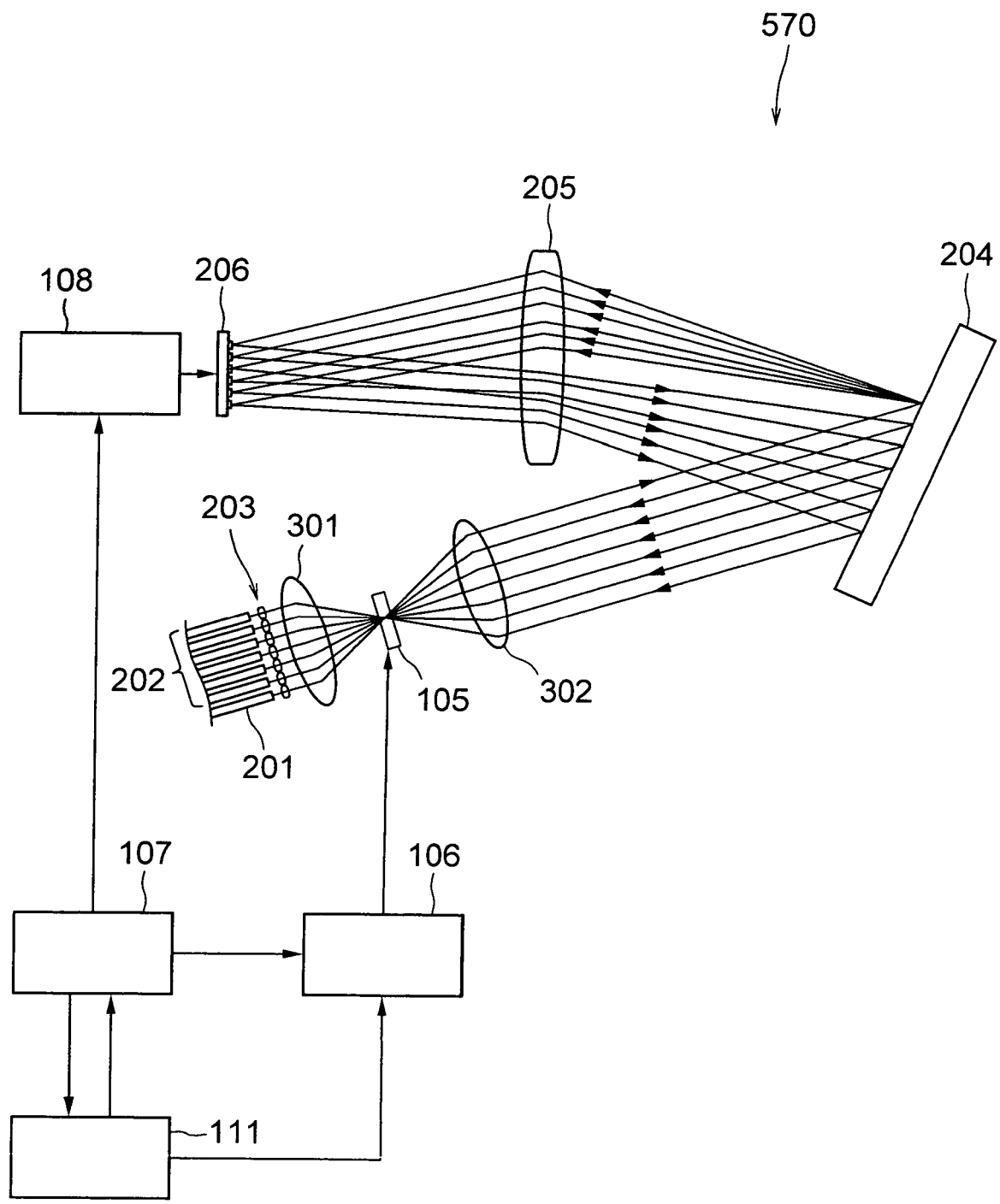
FIG. 17 is a diagram denoting a schematic structure of an optical switch according to a twelfth embodiment of the present invention.

FIG. 17 denotes a schematic structure of an optical switch 570 according to the twelfth embodiment. In the twelfth embodiment, the optical switch 570 includes one optical fiber for input 201 and the plurality of optical fibers for output 202. In the twelfth embodiment, in addition to the structure in the third embodiment, the optical switch 570 includes the power supply monitoring member 111. Accordingly, an effect similar to the effect achieved in the modified embodiment of the first embodiment is achieved.

Thirteenth Embodiment

Figure 18:
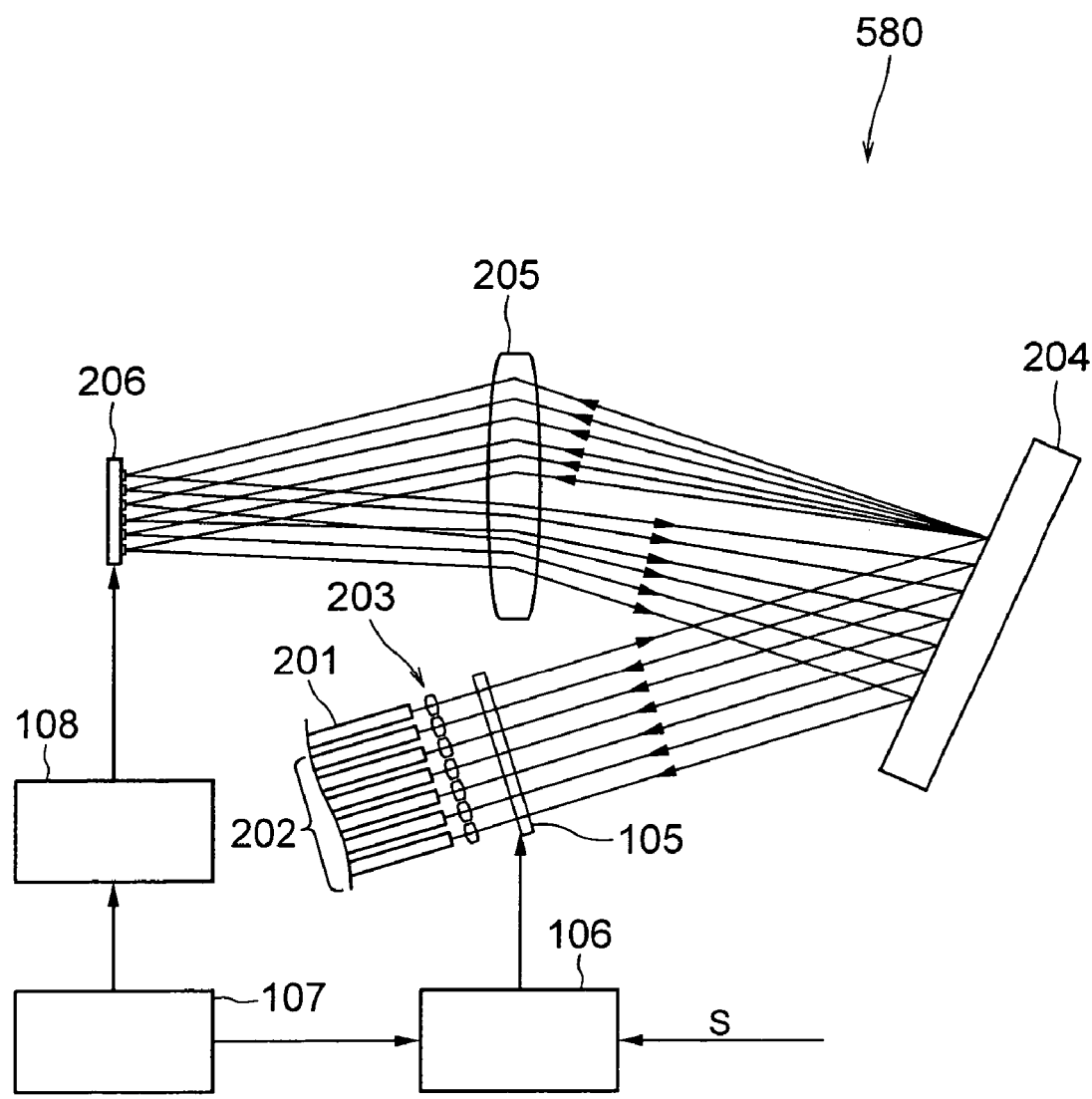
FIG. 18 is a diagram denoting a schematic structure of an optical switch according to a thirteenth embodiment of the present invention.

FIG. 18 denotes a schematic structure of an optical switch 580 according to the thirteenth embodiment. In the thirteenth embodiment, the optical switch 580 includes one optical fiber for input 201 and the plurality of optical fibers for output 202. In the thirteenth embodiment, in addition to the structure in the second embodiment, the shutter driving circuit 106 is controlled from the outside by the control signal S.

The shutter driving circuit 106 drives the shutter 105 based on the control signal S which is sent from an outside of the optical switch 580. The shutter 105 shields the optical paths collectively.

Accordingly, all optical signals can be shielded. Therefore, while building a network in the beginning and while examining the network by using the optical switch 580, the operations can be performed efficiently.

Fourteenth Embodiment

Figure 19:
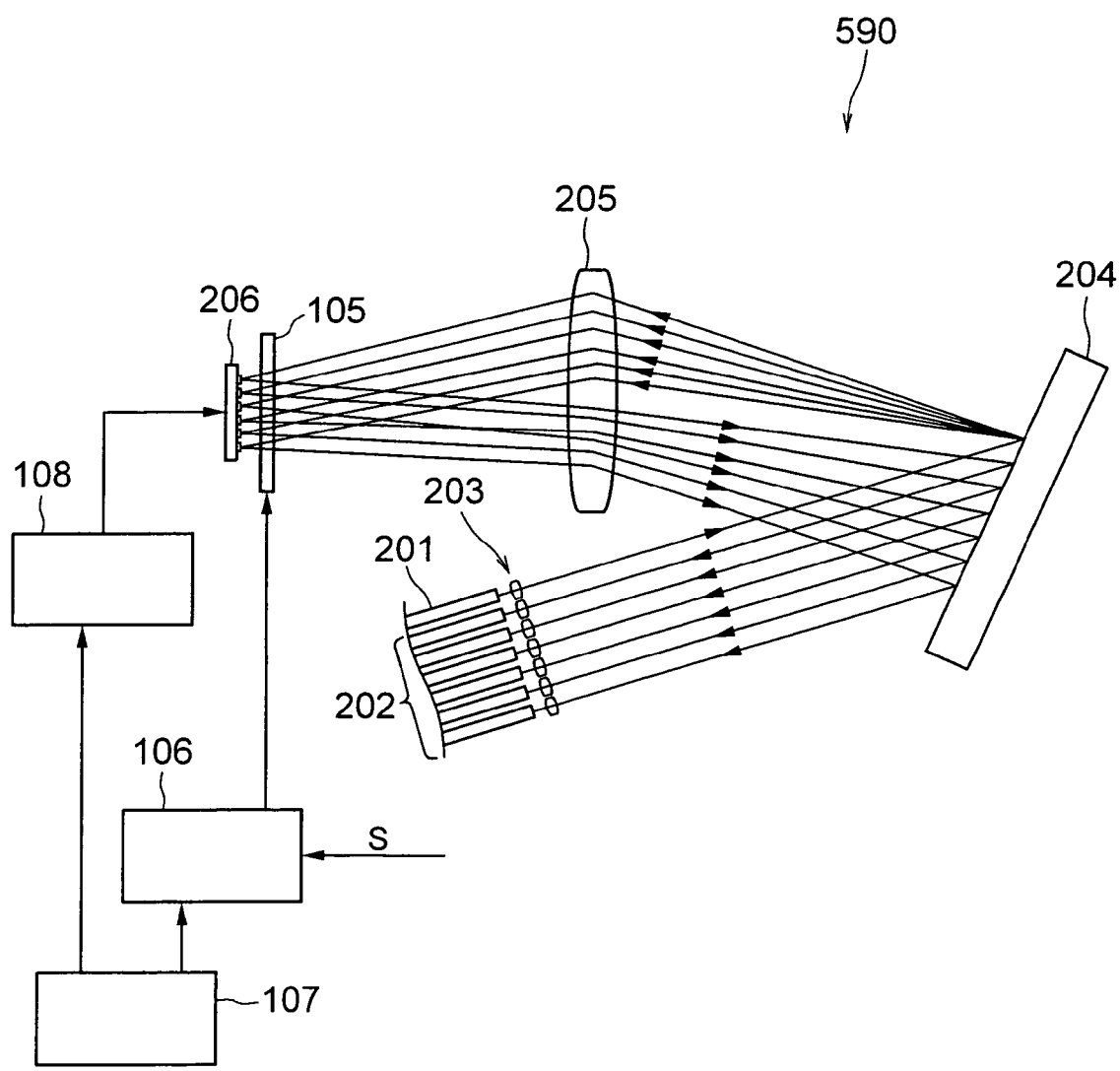
FIG. 19 is a diagram denoting a schematic structure of an optical switch according to a fourteenth embodiment of the present invention.

FIG. 19 denotes a schematic structure of an optical switch 590 according to the fourteenth embodiment. In the fourteenth embodiment, the optical switch 590 includes one optical fiber for input 201 and the plurality of optical fibers for output 202. In the fourteenth embodiment, the shutter 105 is disposed between the diffraction grating 204 and the movable mirror array 206.

Further, the shutter driving circuit 106 is controlled from the outside by the control signal S.

The shutter driving circuit 106 drives the shutter 105 based on the control signal S which is sent from an outside of the optical switch 590. The shutter 105 shields the optical paths collectively.

Accordingly, all optical signals can be shielded. Therefore, while building a network in the beginning and while examining the network by using the optical switch 590, the operations can be performed efficiently.

Fifteenth Embodiment

Figure 20:
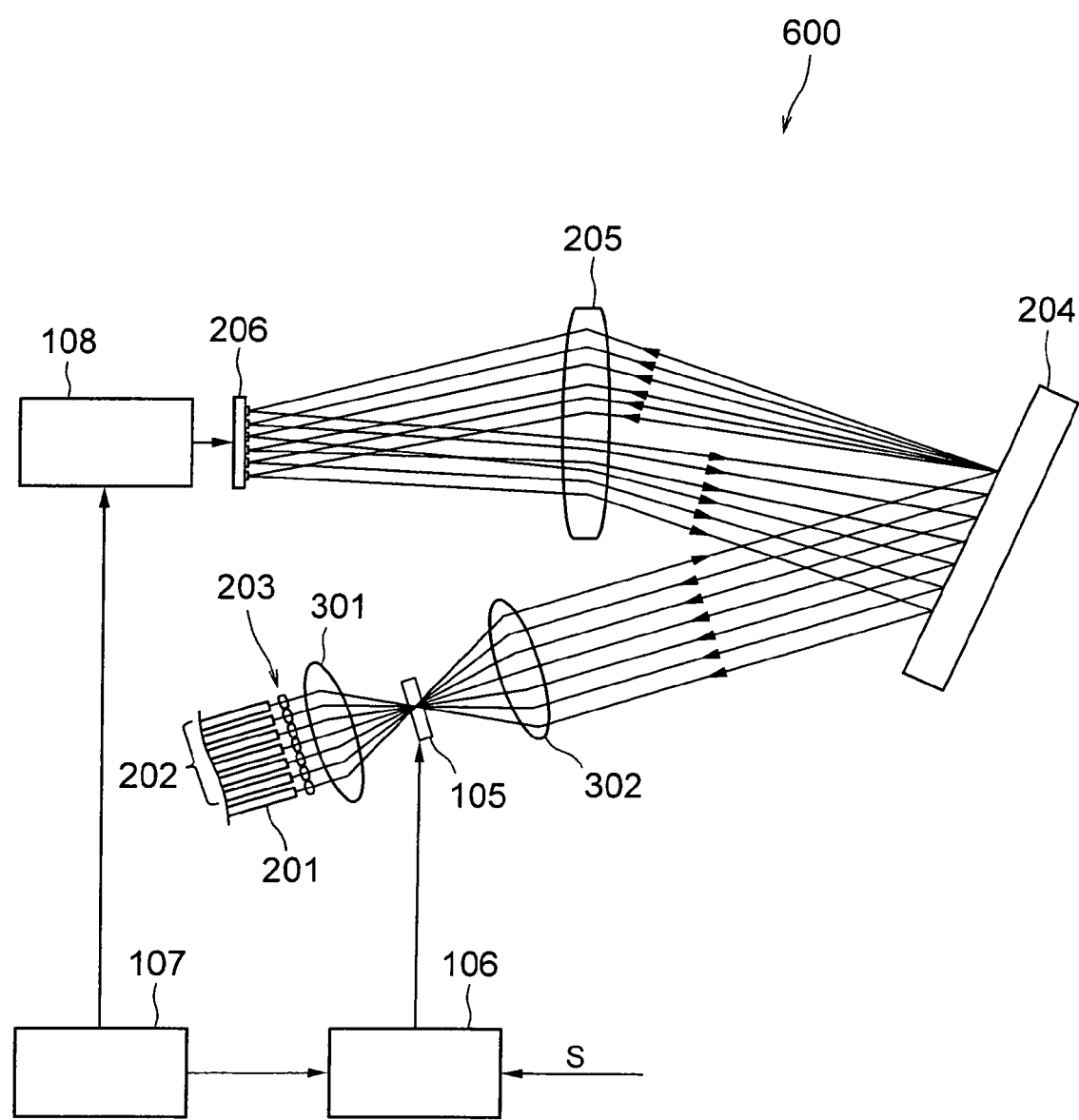
FIG. 20 is a diagram denoting a schematic structure of an optical switch according to a fifteenth embodiment of the present invention.

FIG. 20 denotes a schematic structure of an optical switch 600 according to the fifteenth embodiment. In the fifteenth embodiment, the optical switch 600 includes one optical fiber for input 201 and the plurality of optical fibers for output 202. In the fifteenth embodiment, the shutter driving circuit 106 drives the shutter 105 based on the control signal S which is sent from an outside of the optical switch 600. The shutter 105 shields the optical paths collectively.

Accordingly, all optical signals can be shielded. Therefore, while building a network in the beginning and while examining the network by using the optical switch 600, the operations can be performed efficiently.

Sixteenth Embodiment

Figure 21:
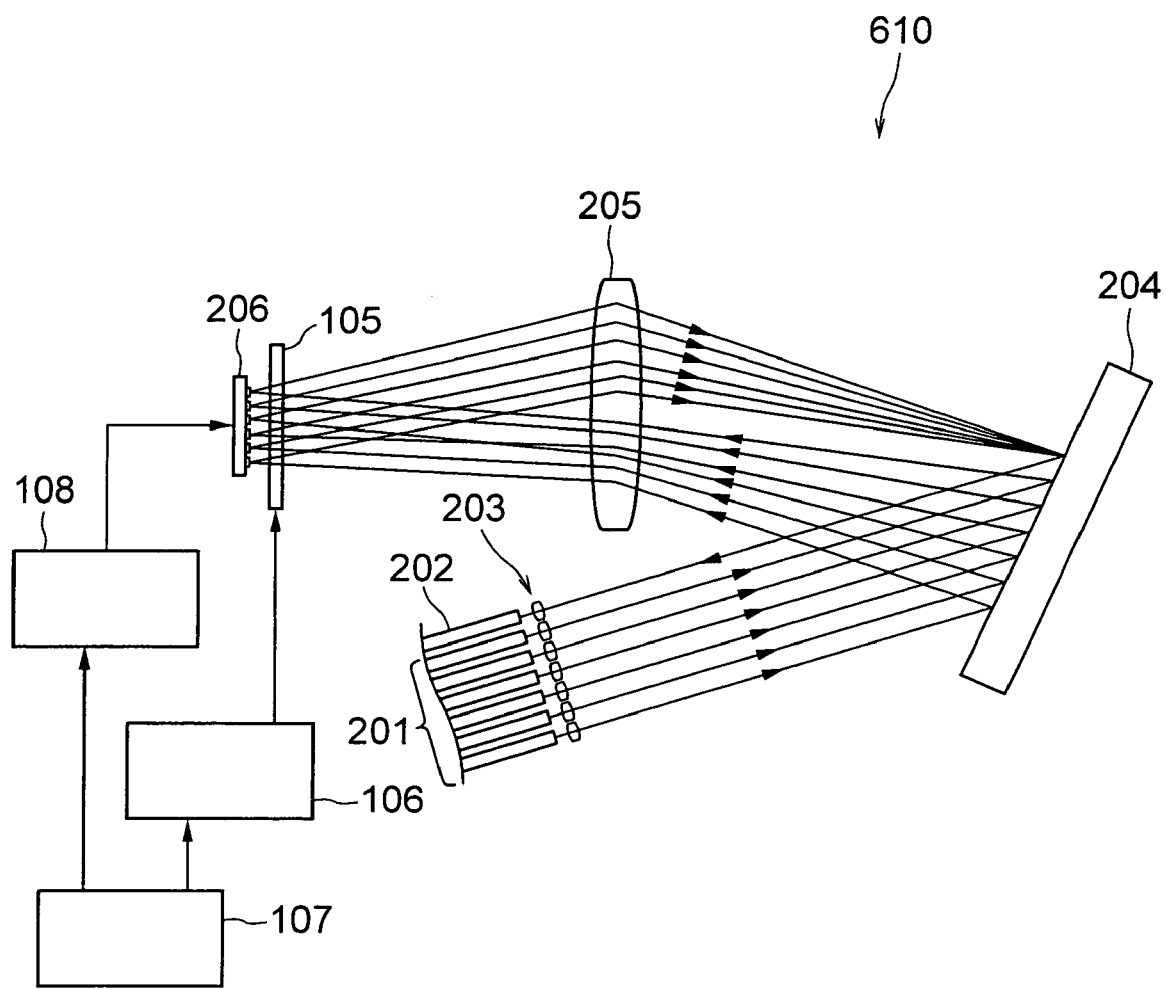
FIG. 21 is a diagram denoting a schematic structure of an optical switch according to a sixteenth embodiment of the present invention.

FIG. 21 denotes a schematic structure of an optical switch 610 according to the sixteenth embodiment. In the sixteenth embodiment, the optical switch 610 includes the plurality of optical fibers for input 201 and one optical fiber for output 202. In the sixteenth embodiment, as compared with the seventh embodiment, the shutter 105 is disposed between the diffraction grating 204 and the movable mirror array 206. Accordingly, the degree of freedom of disposing the shutter 105 is improved. Moreover, the size of the shutter 105 can be reduced.

Seventeenth Embodiment

Figure 22:
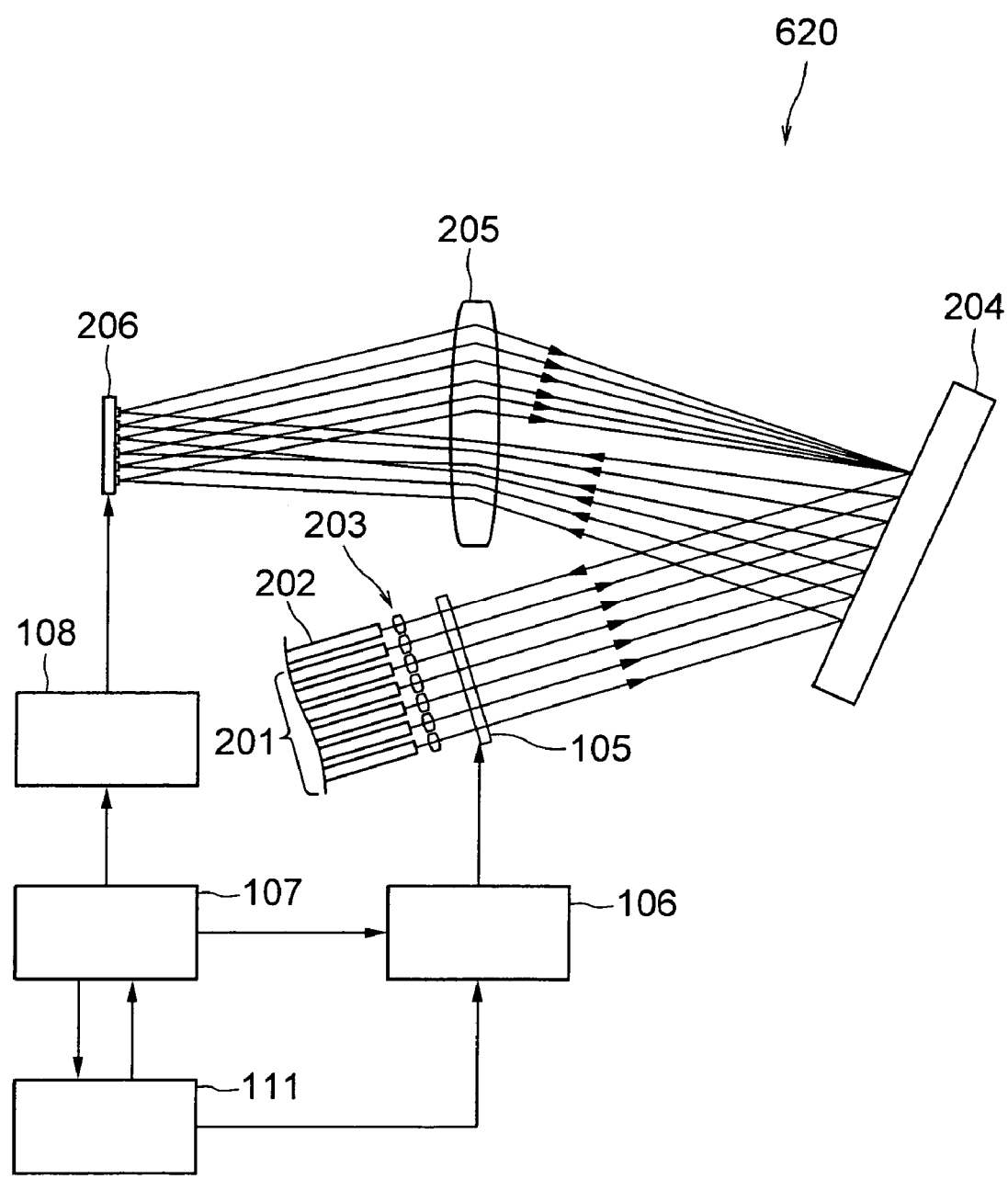
FIG. 22 is a diagram denoting a schematic structure of an optical switch according to a seventeenth embodiment of the present invention.

FIG. 22 denotes a schematic structure of an optical switch 620 according to the seventeenth embodiment. In the seventeenth embodiment, the optical switch 620 includes the plurality of optical fibers for input 201 and one optical fiber for output 202. In the seventeenth embodiment, in addition to the structure in the second embodiment, the optical switch 620 further includes the power supply monitoring member 111. Accordingly, an effect similar to the effect achieved in the modified embodiment of the first embodiment is achieved.

Eighteenth Embodiment

Figure 23:
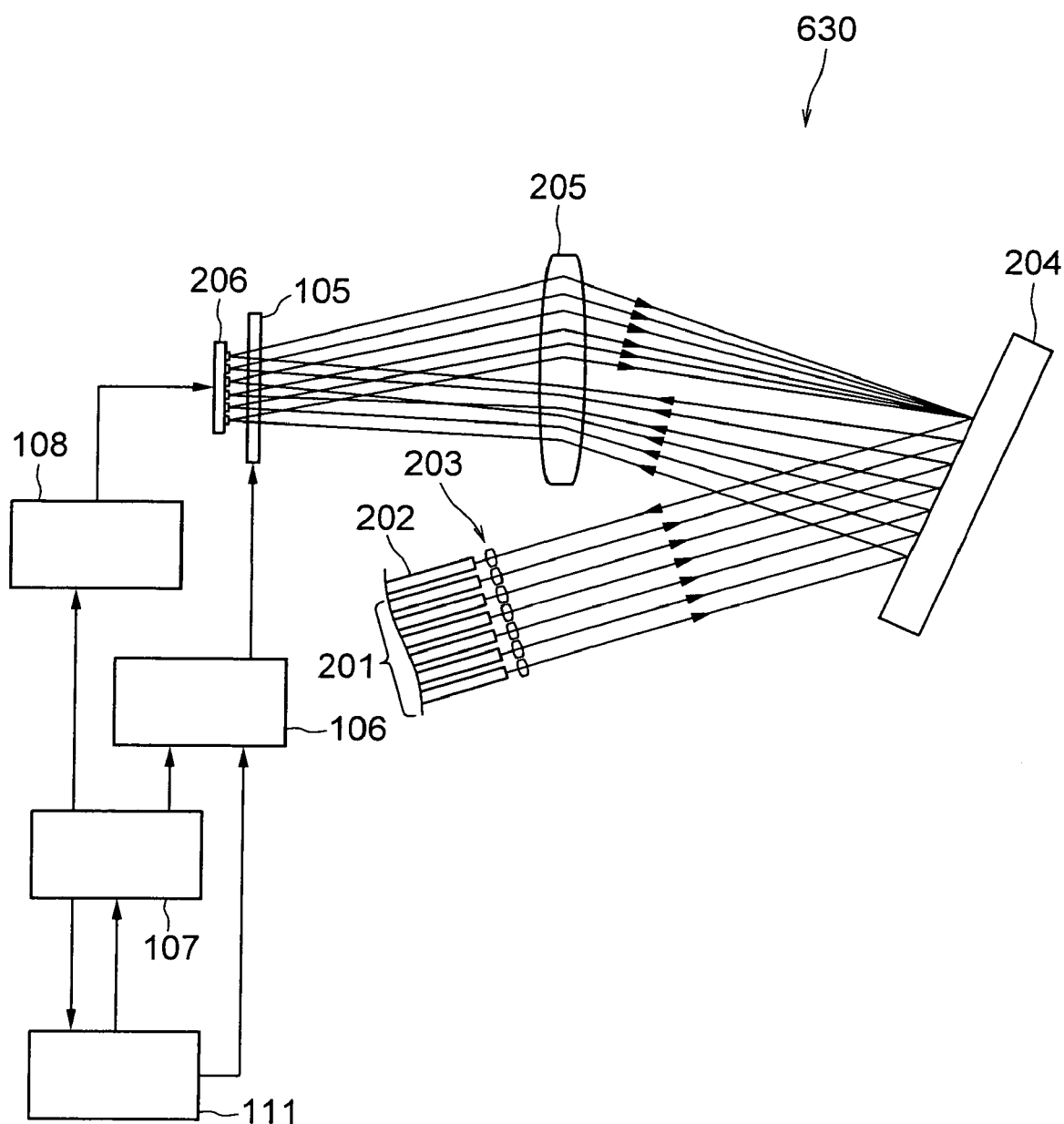
FIG. 23 is a diagram denoting a schematic structure of an optical switch according to an eighteenth embodiment of the present invention.

FIG. 23 denotes a schematic structure of an optical switch 630 according to the eighteenth embodiment. In the eighteenth embodiment, the optical switch 630 includes the plurality of optical fibers for input 201 and one optical fiber for output 202. In the eighteenth embodiment, in addition to the structure in the ninth embodiment, the optical switch 630 further includes the power supply monitoring member 111. Accordingly, an effect similar to the effect achieved in the modified embodiment of the first embodiment is achieved.

Nineteenth Embodiment

Figure 24:
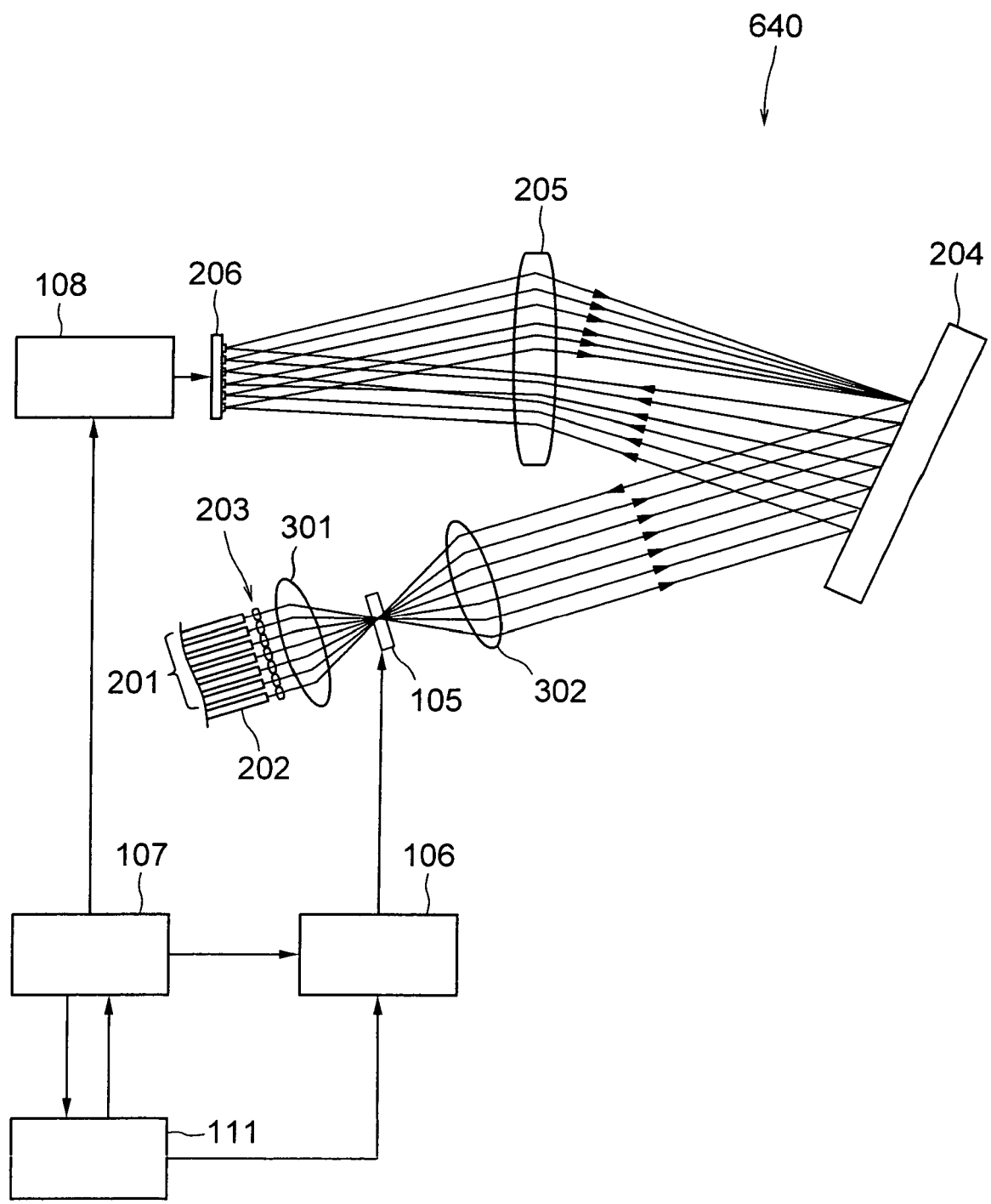
FIG. 24 is a diagram denoting a schematic structure of an optical switch according to a nineteenth embodiment of the present invention.

FIG. 24 denotes a schematic structure of an optical switch 640 according to the nineteenth embodiment. In the nineteenth embodiment, the optical switch 640 includes the plurality of optical fibers for input 201 and one optical fiber for output 202. In the nineteenth embodiment, in addition to the structure in the third embodiment, the optical switch 640 further includes the power supply monitoring member 111. Accordingly, an effect similar to the effect achieved in the modified embodiment of the first embodiment is achieved.

Twentieth Embodiment

Figure 25:
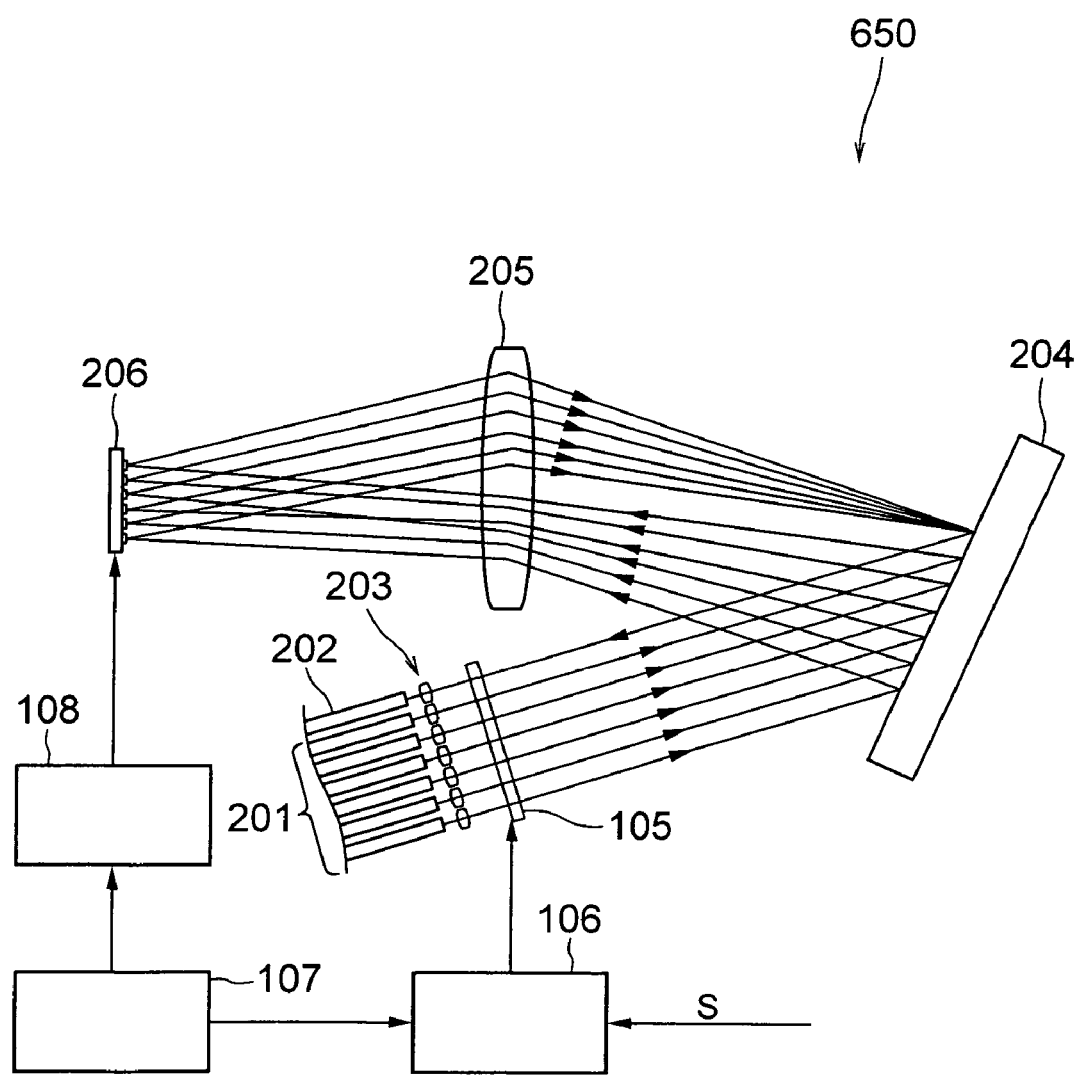
FIG. 25 is a diagram denoting a schematic structure of an optical switch according to a twentieth embodiment of the present invention.

FIG. 25 denotes a schematic structure of an optical switch 650 according to the twentieth embodiment. In the twentieth embodiment, the optical switch 650 includes the plurality of optical fibers for input 201 and one optical fiber for output 202. In the twentieth embodiment, in addition to the structure in the second embodiment, the shutter driving circuit 106 is controlled from the outside by the control signal S.

The shutter driving circuit 106 drives the shutter 105 based on the control signal S which is sent from an outside of the optical switch 650. The shutter 105 shields the optical paths collectively.

Accordingly, all optical signals can be shielded. Therefore, while building a network in the beginning and while examining the network by using the optical switch 650, the operations can be performed efficiently.

Twenty First Embodiment

Figure 26:
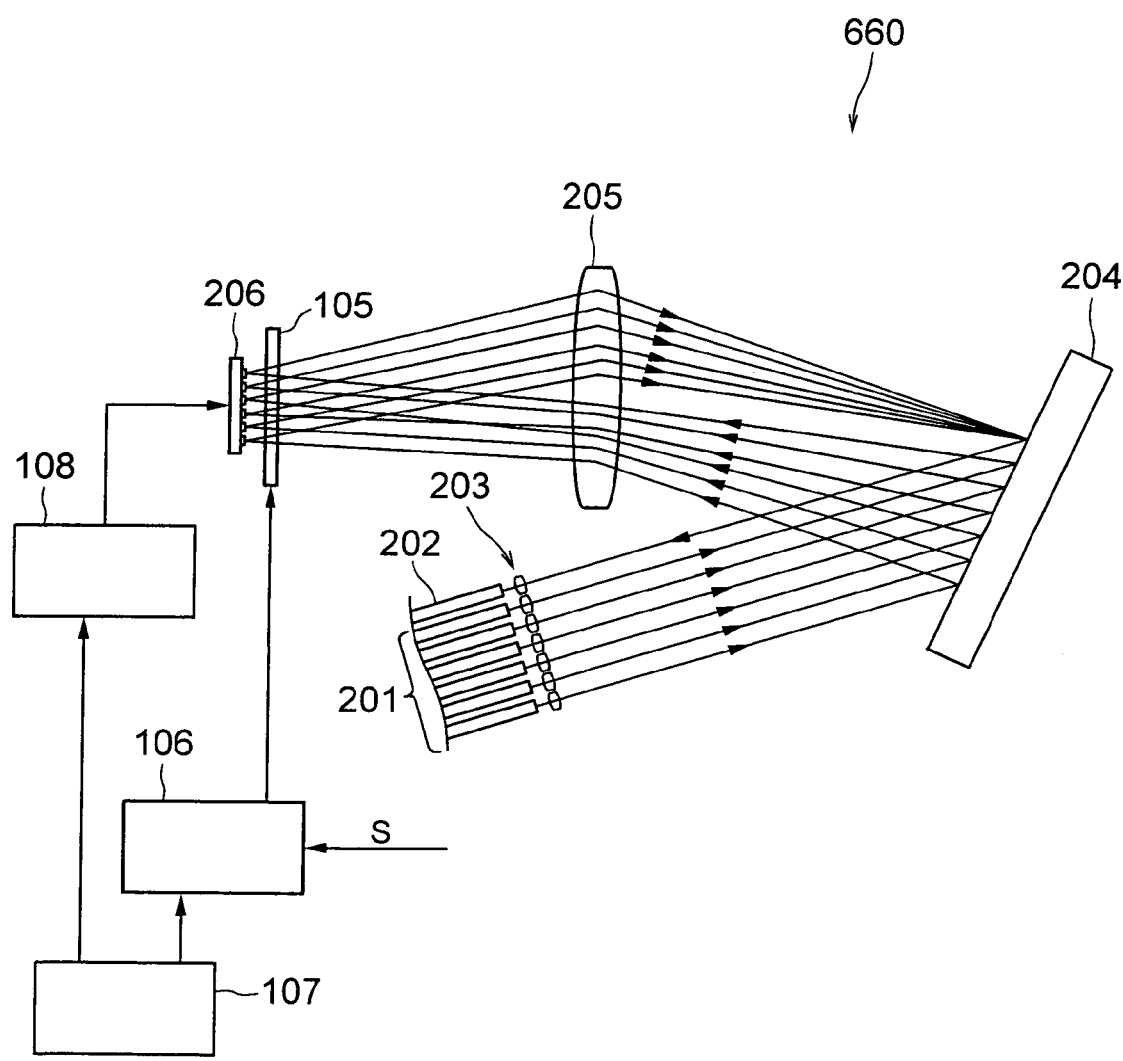
FIG. 26 is a diagram denoting a schematic structure of an optical switch according to a twenty first embodiment of the present invention.

FIG. 26 denotes a schematic structure of an optical switch 660 according to the twenty first embodiment. In the twenty first embodiment, the optical switch 660 includes the plurality of optical fibers for input 201 and one optical fiber for output 202. In the twenty first embodiment, the shutter 105 is disposed between the diffraction grating 204 and the movable mirror array 206.

Further, the shutter driving circuit 106 is controlled from the outside by the control signal S.

The shutter driving circuit 106 drives the shutter 105 based on the control signal S which is sent from an outside of the optical switch 660. The shutter 105 shields the optical paths collectively.

Accordingly, all optical paths can be shielded. Therefore, while building a network in the beginning and while examining the network by using the optical switch 660, the operations can be performed efficiently.

Twenty Second Embodiment

Figure 27:
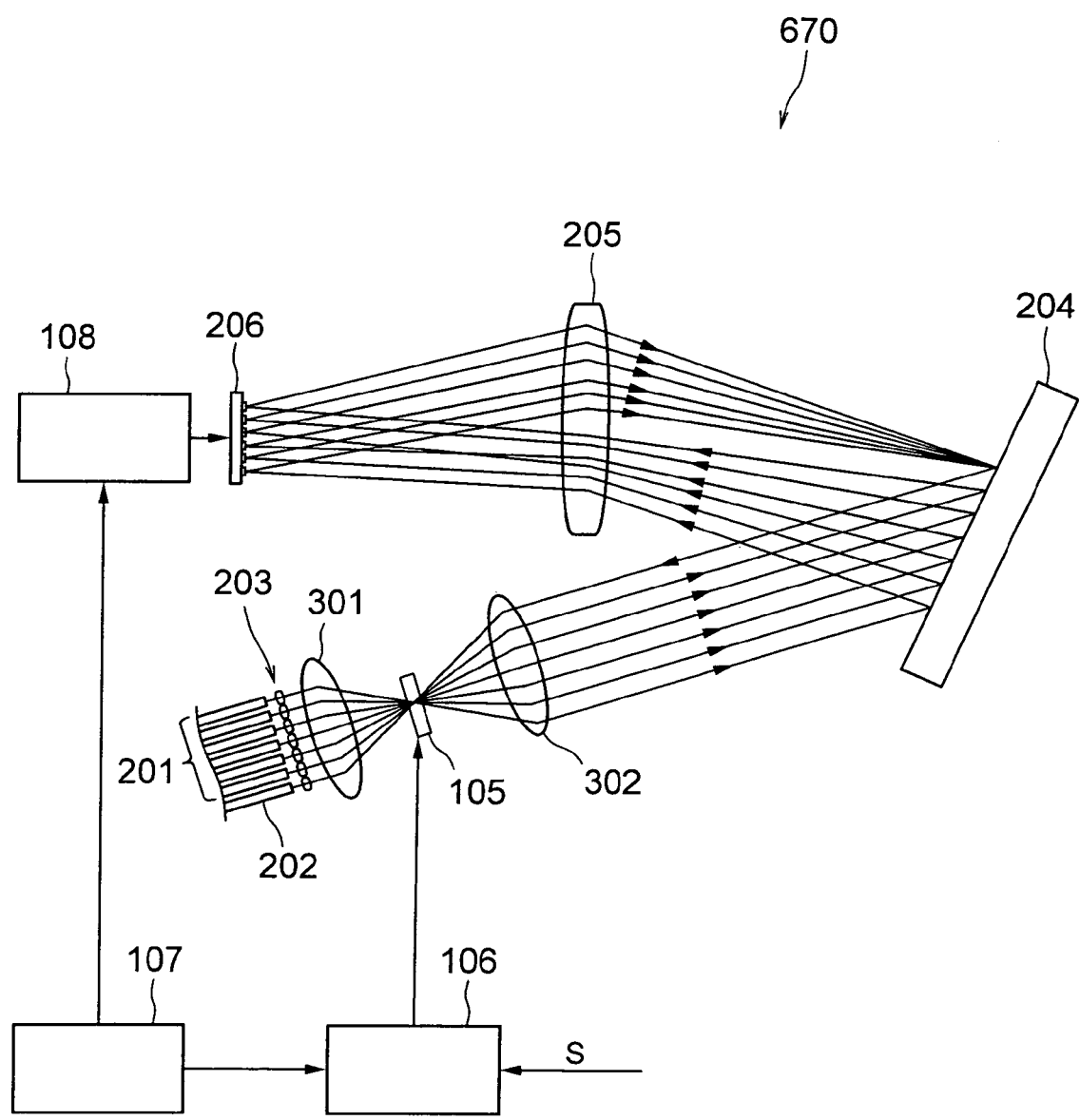
FIG. 27 is a diagram denoting a schematic structure of an optical switch according to a twenty second embodiment of the present invention.

FIG. 27 denotes a schematic structure of an optical switch 670 according to the twenty second embodiment. In the twenty second embodiment, the optical switch 670 includes the plurality of optical fibers for input 201 and one optical fiber for output 202. In the twenty second embodiment, the shutter driving circuit 106 is controlled from the outside by the control signal S.

The shutter driving circuit 106 drives the shutter 105 based on the control signal S which is sent from an outside of the optical switch 670. The shutter 105 shields the optical paths collectively.

Accordingly, all optical signals can be shielded. Therefore, while building a network in the beginning and while examining the network by using the optical switch 670, the operations can be performed efficiently.

Moreover, in each of the embodiments described above, the collimating lens (optical coupling member) is disposed near the optical fibers for input 101 and 102, and the optical fibers for output 201 and 202. However, the present invention is not restricted to the collimating lens as the optical coupling member and is also applicable to an optical switch in which a telecentric optical system is used as the optical coupling member disclosed in, for example, Japanese Patent Application Laid-open Publication No. 2003-279871. Thus, the present invention can have various modified embodiments within the scope of basic teaching.

Thus, an optical switch in the present invention is suitable for an optical switch which includes a movable mirror array.

What is claimed is:

1. An optical switch comprising:
a plurality of light inputting members;
a plurality of light outputting members;
an optical coupling member which couples light to the light inputting members and the light outputting members;
an optical path changing member which changes an optical path from the light inputting members up to the light outputting members;
an optical path shielding member which can take a first position which shields collectively all optical paths from the light inputting members up to the light outputting members, and a second position which allows light to pass through the optical path;

a first driving circuit which drives the optical path changing member; and a second driving circuit which drives the optical path shielding member.

2. The optical switch according to claim 1, further comprising:

a power supply which supplies a voltage to the first driving circuit and the second driving circuit, wherein when there is no supply of voltage from the power supply, the optical path shielding member, by taking the first position, shields collectively all optical paths connecting to the light outputting members, and the light inputting members are optical fibers, and the light outputting members are optical fibers.

3. The optical switch according to claim 2, wherein the optical path changing member includes a movable mirror array which can be electrically controlled by the first driving circuit, and light is output to the light outputting members by electrically controlling an angle of each mirror in the movable mirror array.

4. The optical switch according to claim 3, wherein the optical path shielding member is disposed between the optical coupling member and the movable mirror array.

5. The optical switch according to claim 3, wherein the optical path shielding member is disposed either between the light inputting members and the optical coupling member or between the light outputting members and the optical coupling member.

6. The optical switch according to claim 2, wherein the optical coupling member is a collimating lens.

7. The optical switch according to claim 1, further comprising:

a power supply which supplies a voltage to the first driving circuit and the second driving circuit; and a power supply monitoring member which monitors the voltage supplied by the power supply, wherein when the power supply monitoring member detects a voltage drop in the voltage of the power supply, the second driving circuit drives the optical path shielding member to the first position to shield collectively all optical paths connecting to the light outputting members, and the light inputting members are optical fibers, and the light outputting members are optical fibers.

8. The optical switch according to claim 7, wherein the optical path changing member includes a movable mirror array which can be electrically controlled by the first driving circuit, and light is output to the light outputting members by electrically controlling an angle of each mirror in the movable mirror array.

9. The optical switch according to claim 8, wherein the optical path shielding member is disposed between the optical coupling member and the movable mirror array.

10. The optical switch according to claim 8, wherein the optical path shielding member is disposed either between the light inputting members and the optical coupling member or between the light outputting members and the optical coupling member.

11. The optical switch according to claim 7, wherein the optical coupling member is a collimating lens.

12. The optical switch according to claim 1, wherein the second driving circuit drives the optical path shielding member based on a control signal which is sent from an outside of the optical switch, and the light inputting members are optical fibers, and the light outputting members are optical fibers.

13. The optical switch according to claim 12, wherein the optical path changing member includes a movable mirror array which can be electrically controlled by the first driving circuit, and light is output to the light outputting members by electrically controlling an angle of each mirror in the movable mirror array.

14. The optical switch according to claim 13, wherein the optical path shielding member is disposed between the optical coupling member and the movable mirror array.

15. The optical switch according to claim 13, wherein the optical path shielding member is disposed either between the light inputting members and the optical coupling member or between the light outputting members and the optical coupling member.

16. The optical switch according to claim 12, wherein the optical coupling member is a collimating lens.

17. An optical switch comprising:

a light inputting member;

a plurality of light outputting members;

an optical coupling member which couples light to the light inputting member and the light outputting members;

an optical path changing member which changes an optical path from the light inputting member up to the light outputting members;

an optical path shielding member which can a take a first position which shields collectively all optical paths from the light inputting member up to the light outputting members, and a second position which allows light to pass through the optical path;

a first driving circuit which drives the optical path changing member; and a second driving circuit which drives the optical path shielding member.

18. The optical switch according to claim 17, further comprising:

a power supply which supplies a voltage to the first driving circuit and the second driving circuit, wherein when there is no supply of voltage from the power supply, the optical path shielding member, by taking the first position, shields collectively all optical paths connecting to the light outputting members, and the light inputting member is an optical fiber, and the light outputting members are optical fibers.

19. The optical switch according to claim 18, wherein the optical path changing member includes a movable mirror array which can be electrically controlled by the first driving circuit, and light is output to the light outputting members be electrically controlling an angle of each mirror in the movable mirror array.

20. The optical switch according to claim 19, further comprising:

a first lens and a spectroscope which separate light according to a wavelength, wherein a plurality of light beams having different wavelength is input from the light inputting member, the light which is input passes through the optical coupling member, the spectroscope, and the first lens, and is irradiated on each mirror in the movable mirror array according to the wavelength, and by electrically controlling the angle of each mirror in the movable mirror array, the light is output to the light outputting members.

21. The optical switch according to claim 20, wherein the optical path shielding member is disposed between the optical coupling member and the spectroscope.

22. The optical switch according to claim 20, wherein
the optical path shielding member is disposed between the spectroscope and the movable mirror array.

23. The optical switch according to claim 20, wherein
a relay optical system is provided between the optical coupling member and the spectroscope, and all optical paths connecting to the light outputting members are allowed to intersect at a point, and
the optical path shielding member is disposed at a position where the optical paths intersect at the point.

24. The optical switch according to claim 18, wherein
the optical coupling member is a collimating lens.

25. The optical switch according to claim 17, further comprising:
a power supply which supplies a voltage to the first driving circuit and the second driving circuit; and
a power supply monitoring member which monitors the voltage supplied by the power supply, wherein
when the power supply monitoring member detects a voltage drop in the voltage of the power supply, the second driving circuit drives the optical path shielding member to the first position to shield collectively all optical paths connecting to the light outputting members, and
the light inputting member is an optical fiber, and
the light outputting members are optical fibers.

26. The optical switch according to claim 25, wherein
the optical path changing member includes a movable mirror array which can be electrically controlled by the first driving circuit, and light is output to the light outputting members by electrically controlling an angle of each mirror in the movable mirror array.

27. The optical switch according to claim 26, further comprising:
a first lens and a spectroscope which separate light according to a wavelength, wherein
a plurality of light beams having different wavelength is input from the light inputting member, the light which is input passes through the optical coupling member, the spectroscope, and the first lens, and is irradiated on each mirror in the movable mirror array according to the wavelength, and by electrically controlling the angle of each mirror in the movable mirror array, the light is output to the light outputting members.

28. The optical switch according to claim 27, wherein
the optical path shielding member is disposed between the optical coupling member and the spectroscope.

29. The optical switch according to claim 27, wherein
the optical path shielding member is disposed between the spectroscope and the movable mirror array.

30. The optical switch according to claim 27, wherein
a relay optical system is provided between the optical coupling member and the spectroscope, and all optical paths connecting to the light outputting members are allowed to intersect at a point, and
the optical path shielding member is disposed at a position where the optical paths intersect at the point.

31. The optical switch according to claim 25, wherein
the optical coupling member is a collimating lens.

32. The optical switch according to claim 17, wherein
the second driving circuit drives the optical path shielding member based on a control signal which is sent from an outside of the optical switch, and
the light inputting member is an optical fiber, and
the light outputting members are optical fibers.

33. The optical switch according to claim 32, wherein
the optical path changing member includes a movable mirror array which can be electrically controlled by the first driving circuit, and light is output to the light outputting members by electrically controlling an angle of each mirror in the movable mirror array.

34. The optical switch according to claim 33, further comprising:
a first lens and a spectroscope which separate light according to a wavelength, wherein
a plurality of light beams having different wavelength is input from the light inputting member, the light which is input passes through the optical coupling member, the spectroscope, and the first lens, and is irradiated on each mirror in the movable mirror array according to the wavelength, and by electrically controlling the angle of each mirror in the movable mirror array, the light is output to the light outputting members.

35. The optical switch according to claim 34, wherein
the optical path shielding member is disposed between the optical coupling member and the spectroscope.

36. The optical switch according to claim 34, wherein
the optical path shielding member is disposed between the spectroscope and the movable mirror array.

37. The optical switch according to claim 34, wherein
a relay optical system is disposed between the optical coupling member and the spectroscope, and all optical paths connecting to the light outputting members are allowed to intersect at a point, and
the optical path shielding member is disposed at a position where the optical paths intersect at the point.

38. The optical switch according to claim 32, wherein
the optical coupling member is a collimating lens.

39. An optical switch comprising:
a plurality of light inputting members;
a light outputting member;
an optical coupling member which couples light to the light inputting members and the light outputting member;
an optical path changing member which changes an optical path from the light inputting members up to the light outputting member;
an optical path shielding member which can take a first position which shields collectively all optical paths from the light inputting members up to the light outputting member, and a second position which allows light to pass through the optical path;
a first driving circuit which drives the optical path changing member; and
a second driving circuit which drives the optical path shielding member.

40. The optical switch according to claim 39, further comprising:
a power supply which supplies a voltage to the first driving circuit and the second driving circuit, wherein
when there is no supply of voltage from the power supply, the optical path shielding member, by taking the first position, shields collectively all optical paths connecting to the light outputting member, and
the light inputting members are optical fibers, and
the light outputting member is an optical fiber.

41. The optical switch according to claim 40, wherein
the optical path changing member includes a movable mirror array which can be electrically controlled by the first driving circuit, and light is output to the light outputting member by electrically controlling an angle of each mirror in the movable mirror array.

42. The optical switch according to claim 41, further comprising:
a first lens and a spectroscope which separate light according to a wavelength, wherein
a plurality of light beams having different wavelength is input from the light inputting members, the light which is input passes through the optical coupling member, the spectroscope, and the first lens, and is irradiated on each mirror in the movable mirror array according to the wavelength, and by electrically controlling the angle of each mirror in the movable mirror array, the light is output to the light outputting member.

43. The optical switch according to claim 42, wherein the optical path shielding member is disposed between the optical coupling member and the spectroscope.

44. The optical switch according to claim 42, wherein the optical path shielding member is disposed between the spectroscope and the movable mirror array.

45. The optical switch according to claim 42, wherein
a relay optical system is disposed between the optical coupling member and the spectroscope, and all optical paths connecting to the light outputting member are allowed to intersect at a point, and
the optical path shielding member is disposed at a position where the optical paths intersect at the point.

46. The optical switch according to claim 40, wherein the optical coupling member is a collimating lens.

47. The optical switch according to claim 39, further comprising:
a power supply which supplies a voltage to the first driving circuit and the second driving circuit; and
a power supply monitoring member which monitors the voltage supplied by the power supply, wherein
when the power supply monitoring member detects a voltage drop in the voltage of the power supply, the second driving circuit drives the optical path shielding member to the first position to shield collectively all optical paths connecting to the light outputting member, and
the light inputting members are optical fibers, and
the light outputting member is an optical fiber.

48. The optical switch according to claim 47, wherein the optical path changing member includes a movable mirror array which can be electrically controlled by the first driving circuit, and light is output to the light outputting member by electrically controlling an angle of each mirror in the movable mirror array.

49. The optical switch according to claim 48, further comprising:
a first lens and a spectroscope which separate light according to a wavelength, wherein
a plurality of light beams having different wavelength is input from the light inputting members, the light which is input passes through the optical coupling member, the spectroscope, and the first lens, and is irradiated on each mirror in the movable mirror array according to the wavelength, and by electrically controlling the angle of each mirror in the movable mirror array, the light is output to the light outputting member.

50. The optical switch according to claim 49, wherein the optical path shielding member is disposed between the optical coupling member and the spectroscope.

51. The optical switch according to claim 49, wherein the optical path shielding member is disposed between the spectroscope and the movable mirror array.

52. The optical switch according to claim 49, wherein
a relay optical system is provided between the optical coupling member and the spectroscope, and all optical paths connecting to the light outputting member are allowed to intersect at a point, and
the optical path shielding member is disposed at a position where the optical paths intersect at the point.

53. The optical switch according to claim 47, wherein the optical coupling member is a collimating lens.

54. The optical switch according to claim 39, wherein
the second driving circuit drives the optical path shielding member based on a control signal which is sent from an outside of the optical switch, and
the light inputting members are optical fibers, and
the light outputting member is an optical fiber.

55. The optical switch according to claim 54, wherein
the optical path changing member includes a movable mirror array which can be electrically controlled by the first driving circuit, and light is output to the light outputting member by electrically controlling an angle of each mirror in the movable mirror array.

56. The optical switch according to claim 55, further comprising:
a first lens and a spectroscope which separate light according to a wavelength, wherein
a plurality of light beams having different wavelength is input from the light inputting members, the light which is input passes through the optical coupling member, the spectroscope, and the first lens, and is irradiated on each mirror in the movable mirror array according to the wavelength, and by electrically controlling the angle of each mirror in the movable mirror array, the light is output to the light outputting member.

57. The optical switch according to claim 56, wherein the optical path shielding member is disposed between the optical coupling member and the spectroscope.

58. The optical switch according to claim 56, wherein the optical path shielding member is disposed between the spectroscope and the movable mirror array.

59. The optical switch according to claim 56, wherein
a relay optical system is disposed between the optical coupling member and the spectroscope, and all optical paths connecting to the light outputting member are allowed to intersect at a point, and
the optical path shielding member is disposed at a position where the optical paths intersect at the point.

60. The optical switch according to claim 54, wherein the optical coupling member is a collimating lens.

* * * * *